(12) United States Patent
Watanabe et al.

(10) Patent No.: US 12,306,208 B2
(45) Date of Patent: May 20, 2025

(54) INFORMATION PROVIDING SYSTEM, SERVER DEVICE, AND ANALYZER

(71) Applicant: SHIMADZU CORPORATION, Kyoto (JP)

(72) Inventors: Kazuma Watanabe, Kyoto (JP); Hiroshi Arai, Kyoto (JP); Masato Hirade, Kyoto (JP); Yuichiro Ikeda, Kyoto (JP); Hideo Nakajima, Kyoto (JP); Kenji Yamasaki, Kyoto (JP); Keita Fujino, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 348 days.

(21) Appl. No.: 17/706,384

(22) Filed: Mar. 28, 2022

(65) Prior Publication Data

US 2022/0357359 A1    Nov. 10, 2022

(30) Foreign Application Priority Data

May 7, 2021   (JP) ................... 2021-079083

(51) Int. Cl.
*G01Q 30/04*     (2010.01)
*G01Q 10/06*     (2010.01)
*G01Q 20/02*     (2010.01)

(52) U.S. Cl.
CPC ............. *G01Q 30/04* (2013.01); *G01Q 10/06* (2013.01); *G01Q 20/02* (2013.01)

(58) Field of Classification Search
CPC ......... G01Q 30/04; G01Q 10/06; G01Q 20/02
See application file for complete search history.

(56) References Cited

U.S. PATENT DOCUMENTS

| | | |
|---|---|---|
| 2001/0011706 A1 | 8/2001 | Nara et al. |
| 2006/0077540 A1 | 4/2006 | Miyamoto |
| 2006/0230474 A1 | 10/2006 | Mininni et al. |
| 2013/0145299 A1 | 6/2013 | Steimle et al. |
| 2014/0238106 A1 | 8/2014 | Kashima et al. |
| 2014/0362375 A1 | 12/2014 | Ikeda et al. |
| 2015/0076348 A1 | 3/2015 | Konishi et al. |
| 2019/0324053 A1 | 10/2019 | Watanabe et al. |

(Continued)

FOREIGN PATENT DOCUMENTS

| | | |
|---|---|---|
| CN | 104137219 A | 11/2014 |
| CN | 115308440 A | 11/2022 |

(Continued)

OTHER PUBLICATIONS

Office Action dated Apr. 2, 2024 in counterpart application JP 2021-079083.

(Continued)

*Primary Examiner* — Nicole M Ippolito
(74) *Attorney, Agent, or Firm* — Muir Patent Law, PLLC

(57) ABSTRACT

Provided is a technique for making a user analyze a sample while providing convenience to the user. An information providing system is provided with a determination unit configured to determine whether or not the part needs to be replaced, a display unit, and a display control unit configured to control the display unit. The display control unit causes the display unit to display supplier information on a supplier of the part when the part needs to be replaced.

10 Claims, 15 Drawing Sheets

(56) References Cited

U.S. PATENT DOCUMENTS

2021/0311091 A1    10/2021  Watanabe et al.
2022/0357359 A1    11/2022  Watanabe et al.
2022/0358636 A1*   11/2022  Watanabe .............. G01Q 30/04

FOREIGN PATENT DOCUMENTS

| JP | 2000-164164 A | 6/2000 |
| JP | 2003344422 A | 12/2003 |
| JP | 2006098794 A | 4/2006 |
| JP | 3131828 U | 4/2007 |
| JP | 2007242287 A | 9/2007 |
| JP | 2008-128895 A | 6/2008 |
| JP | 2013534310 A | 9/2013 |
| JP | 2014145691 A | 8/2014 |
| JP | 5939144 B2 | 6/2016 |
| JP | 6631650 B2 | 1/2020 |
| WO | 2013099928 A1 | 7/2013 |
| WO | 2020021698 A1 | 1/2020 |

OTHER PUBLICATIONS

Office Action dated Mar. 5, 2024 in counterpart application JP 2021-079082.
Apr. 23, 2024 Office Action in U.S. Appl. No. 17/706,264.
Office Action dated Aug. 13, 2024, for corresponding JP Application No. 2021-079082.
Office Action dated Oct. 8, 2024, for corresponding JP Application No. 2021-079083.
First Office Action dated Jan. 21, 2025, for corresponding application No. 202210454768.0, along with English-language translation of the same.
First Office Action dated Jan. 23, 2025, for corresponding Chinese Patent Application No. CN 202210454321.3.

* cited by examiner

FIG. 5

Parts Management Table
342

| Parts | Supplier | Ordering address |
|---|---|---|
| Cantilever A | Parts manufacturer A | http://·············· |
| | Parts manufacturer B | http://·············· |
| Cantilever B | Parts manufacturer B | http://·············· |
| Cantilever C | Parts manufacturer A | http://·············· |
| | Parts manufacturer B | http://·············· |
| | Parts manufacturer C | http://·············· |
| Cantilever D | Parts manufacturer D | http://·············· |
| Cantilever E | Parts manufacturer E | http://·············· |
| ... | ... | ... |
| Holder A | Device manufacturer | http://·············· |
| Holder B | Device manufacturer | http://·············· |
| Holder C | Device manufacturer | http://·············· |
| Holder D | Parts manufacturer A | http://·············· |
| | Parts manufacturer C | http://·············· |
| Holder E | Device manufacturer | http://·············· |
| | Parts manufacturer B | http://·············· |
| ... | ... | ... |

FIG. 6

User management table

| User | Parts | Purchase history | | | | Elapsed period from the last time | Average interval period | Replacement flag | Suggested supplier |
|---|---|---|---|---|---|---|---|---|---|
| User A | Cantilever A | 2019/12/4 Parts manufacturer A | 2020/2/10 Parts manufacturer A | 2020/4/15 Parts manufacturer A | ... | 70 days | 63 days | 1 | Parts manufacturer A |
| | Holder A | 2020/1/12 Device manufacturer | 2020/6/15 Device manufacturer | 2020/11/14 Device manufacturer | ... | 31 days | 165 days | 0 | Device manufacturer |
| | Cantilever A | 2019/10/1 Parts manufacturer A | 2019/11/15 Parts manufacturer A | 2020/1/6 Parts manufacturer B | ... | 50 days | 42 days | 1 | Parts manufacturer B |
| User B | Cantilever B | 2020/2/8 Parts manufacturer B | 2020/5/9 Parts manufacturer B | 2020/8/4 Parts manufacturer B | ... | 75 days | 85 days | 0 | Parts manufacturer B |
| | Holder D | 2019/10/1 Parts manufacturer C | 2020/3/10 Parts manufacturer C | 2020/9/6 Parts manufacturer C | ... | 162 days | 155 days | 1 | Parts manufacturer C |
| User C | Cantilever D | | | | ... | | | ... | ... |
| | Cantilever C | | | | ... | | | ... | ... |
| User D | Holder B | | | | ... | | | ... | ... |
| | Holder E | | | | ... | | | ... | ... |
| User E | Cantilever E | | | | ... | | | ... | ... |
| | Holder D | | | | ... | | | ... | ... |
| ... | | | | | | | | | |

343

Examples of Steps Related to Analysis

Example of software startup screen

Example of Screen During Parameter Adjustment

INFORMATION PROVIDING SYSTEM, SERVER DEVICE, AND ANALYZER

CROSS-REFERENCE TO RELATED APPLICATIONS

This application claims priority under 35 U.S.C. § 119 to Japanese Patent Application No. 2021-079083 filed on May 7, 2021, the entire disclosure of which is incorporated herein by reference in its entirety.

BACKGROUND OF THE INVENTION

Field of the Invention

The present disclosure relates to an information providing system for providing information on parts used for analyzing a sample by an analyzer, a server device in communication with an analyzer for analyzing a sample, and an analyzer for analyzing a sample.

Description of the Background Art

Conventionally, an analyzer for analyzing a sample is known. For example, WO2020/021698 discloses a scanning probe microscope for acquiring information on a sample surface by using a cantilever provided with a probe.

SUMMARY OF THE INVENTION

In an analyzer, such as, e.g., a scanning probe microscope disclosed in WO2020/021698, it was inevitable for the user itself to determine whether or not a part, such as, e.g., a cantilever, needs to be replaced and search the supplier of the part in a case where the part needs to be replaced. For this reason, the conventional analyzer was not always convenient for the user.

The present disclosure has been made to solve such a problem. An object of the present disclosure is to provide a technique capable of making a user analyze a sample while providing convenience to the user.

An analyzer according to one aspect of the present disclosure is provided with a determination unit configured to determine whether or not a part needs to be replaced, a display unit, and a display control unit configured to control the display unit. The display control unit causes the display unit to display supplier information on a supplier of the part when the part needs to be replaced.

A server device according to another aspect of the preset disclosure is provided with a server-side communication unit in communication with an analyzer and a determination unit configured to determine whether or not a part used to analyze the sample needs to be replaced. The server-side communication unit transmits supplier information on a supplier of the part to the analyzer when the part needs to be replaced.

An analyzer according to still another aspect of the present disclosure is provided with a determination unit configured to determine whether or not a part used to analyze a sample needs to be replaced, a display unit, and a display control unit configured to control the display unit. The display control unit causes the display unit to display supplier information on a supplier of the part when the part needs to be replaced.

An information providing method according to still yet another aspect of the present disclosure includes the steps of: determining whether or not the part needs to be replaced; and causing the display unit to display supplier information on a supplier of the part when the part needs to be replaced.

An information providing method according to still yet another aspect of the present disclosure includes the steps of: determining whether or not a part needs to be replaced; and notifying a supplier of the part of at least one of information indicating that the part needs to be replaced and information for identifying an analyzer when the part needs to be replaced.

The above-described objects and other objects, features, aspects, and advantages of the present invention will become apparent from the following detailed descriptions of the present invention that can be understood with reference to the attached drawings.

BRIEF DESCRIPTION OF THE DRAWINGS

FIG. 5 is a diagram for explaining a parts management table stored in a server device according to the embodiment.

FIG. 6 is a diagram for explaining a user management table stored in the server device according to the embodiment.

DESCRIPTION OF THE EMBODIMENTS

Figure 1:
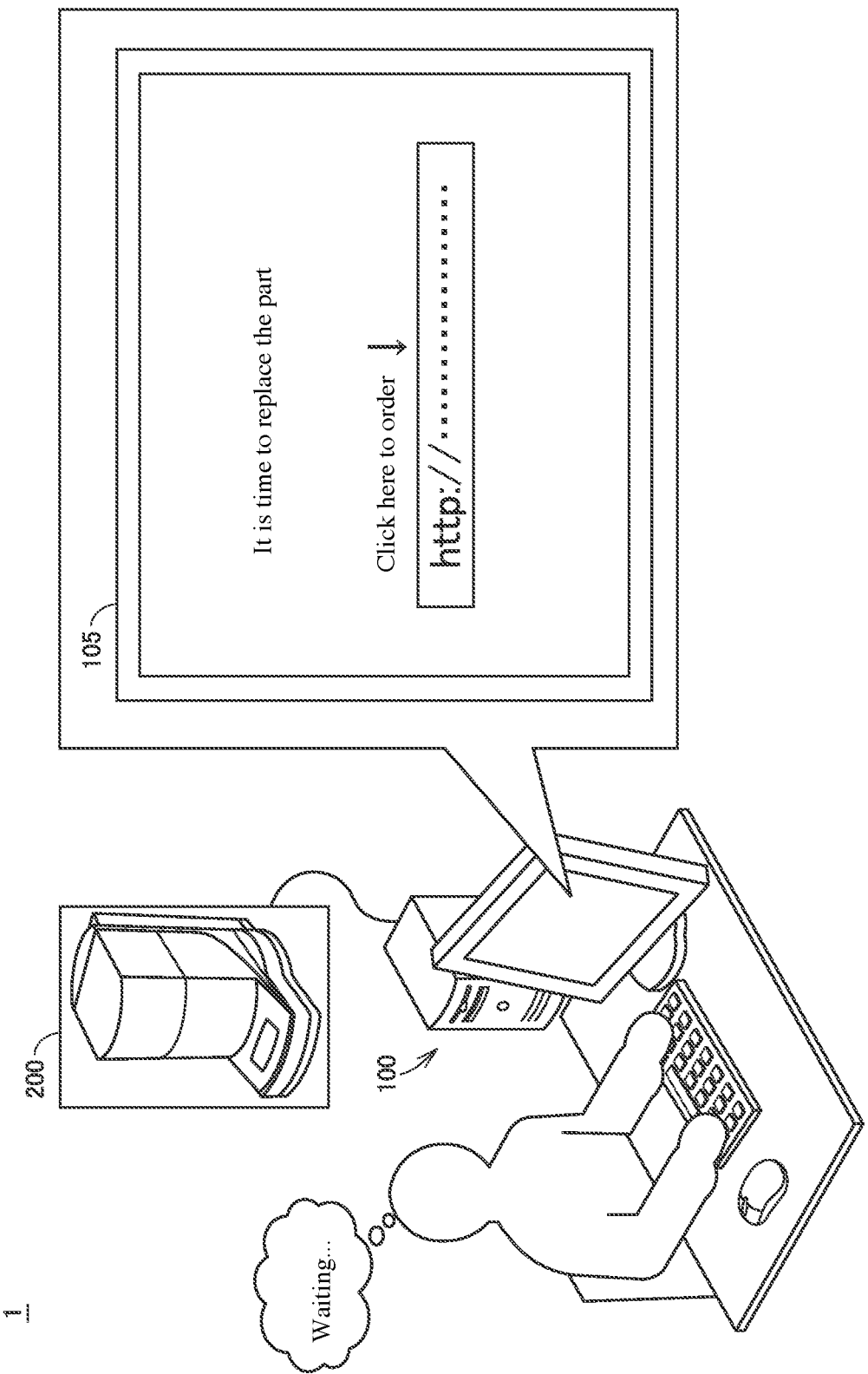
FIG. 1 is a diagram showing an example of information provision on a part by an analyzer according to an embodiment of this disclosure.

An embodiment will be explained in detail with reference to the attached drawings. The same or corresponding portion in the drawings is denoted by the same reference numeral, and the description thereof will not be generally repeated.

[Example of Information Provision by Analyzer]

FIG. 1 is a diagram showing an example of an information provision on a part by an analyzer 1 according to this embodiment. As shown in FIG. 1, the analyzer 1 according to this embodiment is provided with a control device 100 and an observation device 200.

The observation device 200 is configured to observe a sample to output the observation result to the control device 100. The control device 100 is configured to control the observation device 200 to analyze the sample based on the observation result acquired from the observation device 200.

In the analyzer 1, there sometimes occurs a time during which a user has to wait in the step of analyzing the sample. When such a waiting time occurs, the user gets bored, which may stress the user.

Therefore, the analyzer 1 according to this embodiment causes the display device 105 to display predetermined information in a step in which the user is waiting among the steps of analyzing the sample.

Further, in the analyzer 1, at least one or more parts (e.g., consumables) are used to analyze the sample, but it is not convenient for the user in a case where the user itself has to determine whether or not the part needs to be replaced and search the supplier of the part. For parts manufacturers, it is difficult to predict the timing of receiving the part order, which may cause a risk that the user will deal with other manufacturers.

Therefore, the analyzer 1 according to this embodiment causes the display device 105 to display the information on the supplier of the part (hereinafter also referred to as "supplier information") when the part needs to be replaced. The "part" may be a component of a portion of the analyzer 1 or may be a component that is not the part of the analyzer 1 but is used to analyze a sample.

In FIG. 1, the supplier information is illustrated as the "predetermined information," but the "predetermined information" may include other information. For example, the "predetermined information" includes at least any one of the information on the advice for the sample analysis, the information on the part, the information on the progress of the sample analysis, and the information on other analyzers other than the analyzer 1.

More specifically, the "information on the part" includes at least one of the information for prompting the replacement of the part, the supplier information on the above-described supplier of the part, the information on the degree of consumption of the part, and information on the advertisement of the part. For example, in the example shown in FIG. 1, the message "It's a time to replace the part" is displayed on the display device 105 as the message of the "information for prompting the replacement of the part."

The "supplier information" includes the address to which the user places the order of the part to the supplier. For example, in the example shown in FIG. 1, the address of the supplier is displayed on the display device 105 in addition to the message "Click here to order," as the "supplier information." The "supplier" is a supplier to which the user can place an order of a part in the future and includes at least one of the producer and the seller of the part.

Note that the "information on the progress of the analysis of the sample" includes at least any one of the image in which the step of analyzing the sample is imaged and the image in which the step of analyzing the sample is animated.

As described above, the analyzer 1 according to this embodiment causes the display device 105 to display the predetermined information in the step in which the user is waiting. This assures that the user will not get bored with the waiting time as much as possible during the waiting time. Therefore, the analyzer 1 can make the user analyze the sample without stressing the user as much as possible.

Further, in the analyzer 1 according to this embodiment, since the supplier information is displayed on the display device 105 when the part needs to be replaced, there is no need for the user itself to determine whether or not the part needs to be replaced or for the user itself to search the supplier of the part. Therefore, the analyzer 1 can make the user analyze the sample while providing convenience to the user.

[General Configuration of Information Providing System 1000]

Figure 2:
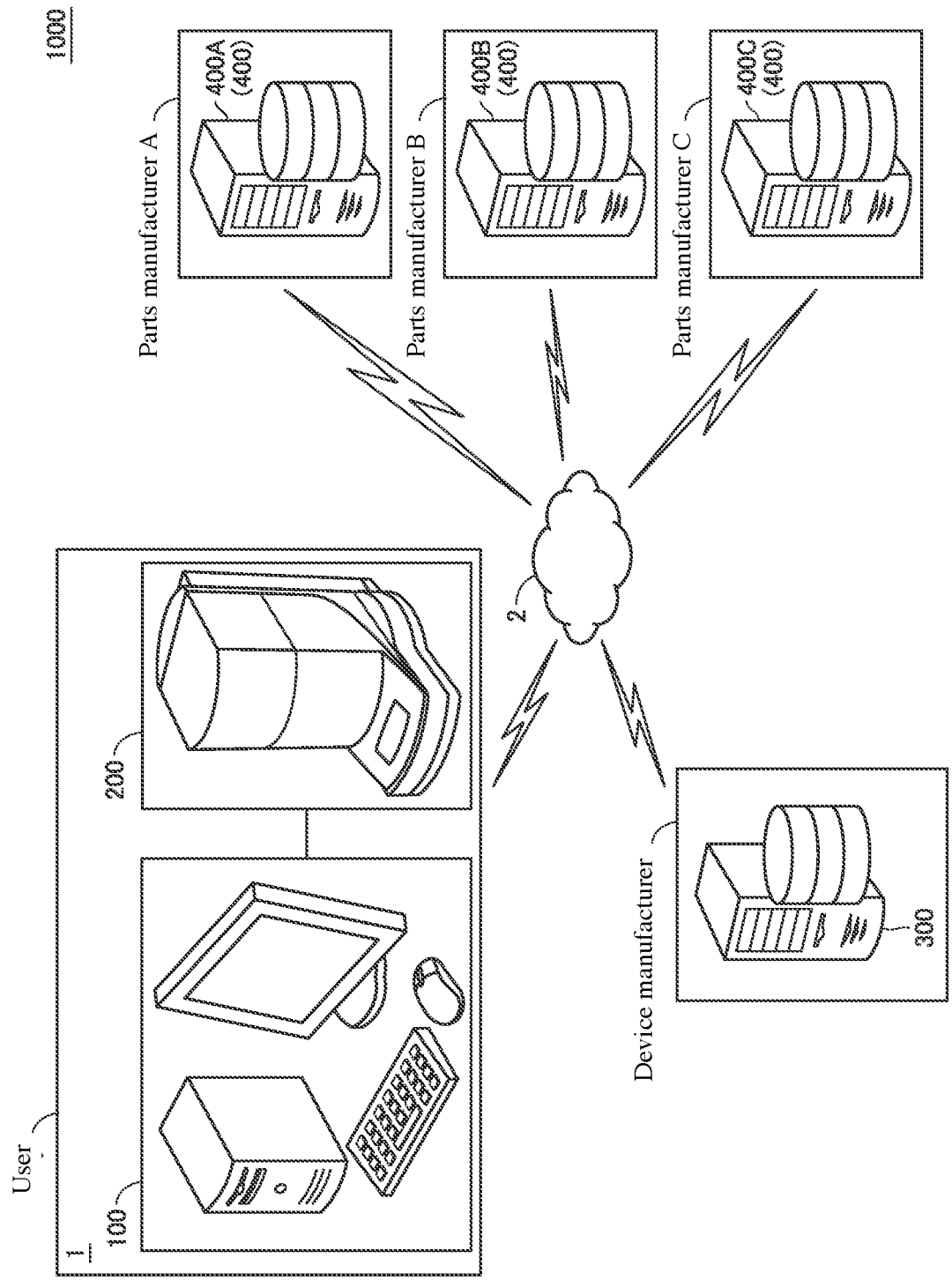
FIG. 2 is a diagram showing an information providing system according to the embodiment.

FIG. 2 is a view showing the information providing system 1000 according to this embodiment. As shown in FIG. 2, the information providing system 1000 is provided with the analyzer 1 belonging to the user side, a server device 300 belonging to the manufacturer (hereinafter, also referred to as "device manufacturer") side of the analyzer 1, and at least one or more supplier terminals 400 belonging to the supplier of the part. In the example shown in FIG. 2, the information providing system 1000 is provided with a supplier terminal 400A belonging to a parts manufacturer A side, a supplier terminal 400B belonging to a parts manufacturer B side, and a supplier terminal 400C belonging to a parts manufacturer C side.

The control device 100 of the analyzer 1, the server device 300 of the device manufacturer, and the supplier terminal 400 of each parts manufacturer are communicably connected to each other via the network 2.

According to the information providing system 1000 configured as described above, the user can place an order of the part from the control device 100 of the analyzer 1 to a device manufacturer or a parts manufacturer.

[Hardware Configuration of Information Providing System 1000]

Figure 3:
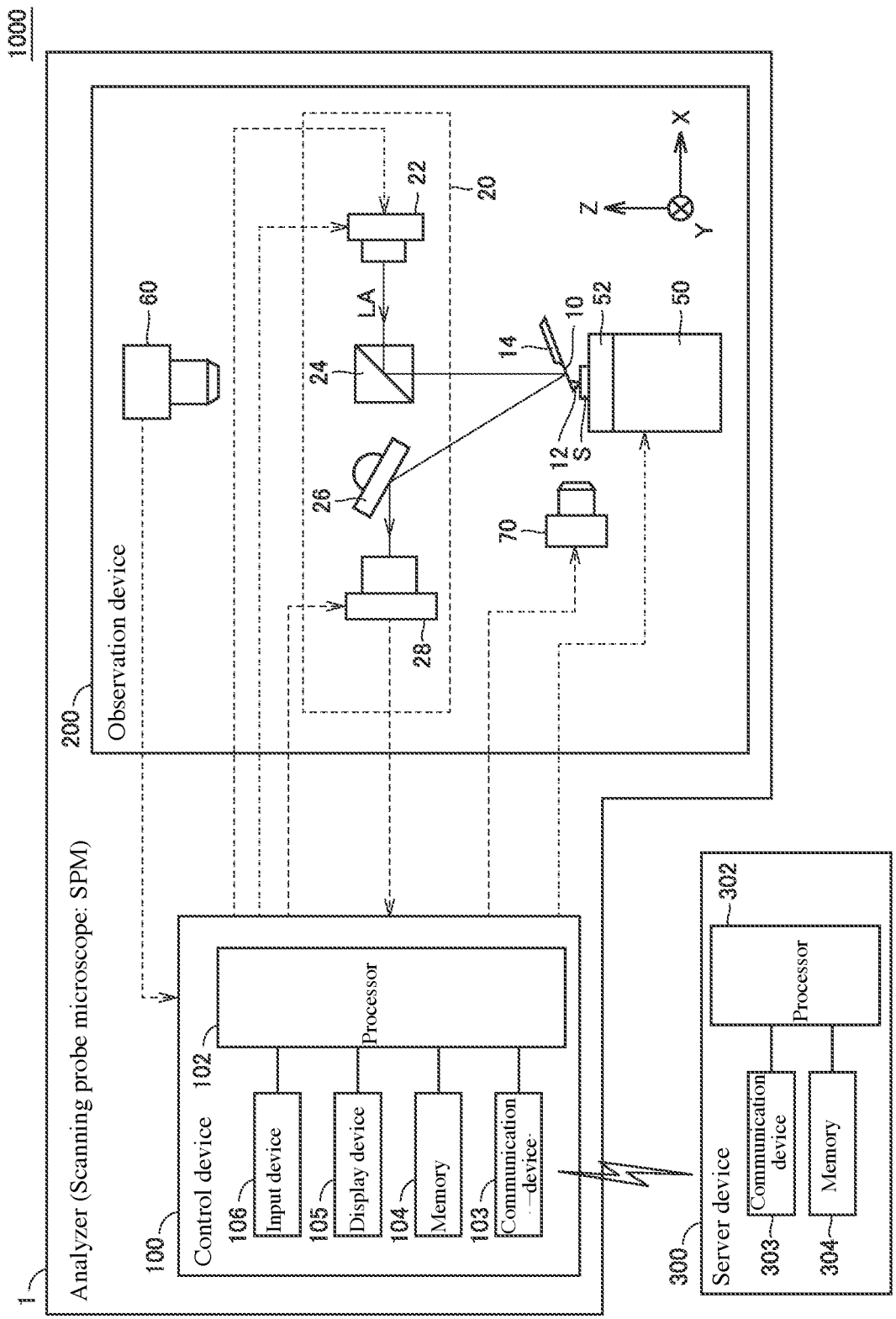
FIG. 3 is a diagram showing the hardware configuration of the information providing system according to the embodiment.

FIG. 3 is a diagram showing the hardware configuration of the information providing system 1000 according to this embodiment. FIG. 3 shows the analyzer 1 and the server device 300 as one configuration of the information providing system 1000. In this embodiment, a scanning probe microscope is exemplified as the analyzer 1. Note that the scanning probe microscope is also referred to as an SPM (Scanning Probe Microscope). In the example shown in FIG. 3, an X-axis and a Y-axis are defined to be parallel to the ground plane of the analyzer 1 (SPM), and a Z-axis is defined to be perpendicular to each of the X-axis and the Y-axis.

The analyzer 1 is provided with the observation device 200 and the control device 100 for controlling the observation device 200.

The observation device 200 is provided with a cantilever 10, a holder 14, an optical system 20, a scanner 50, a sample holding unit 52, an imaging unit 60, and an imaging unit 70.

The cantilever 10 is provided to be positioned above (in the Z-axis direction in the example shown in FIG. 1) the sample S placed on the sample holding unit 52. The holder 14 supports the cantilever 10 so that the cantilever 10 can be vibrated in the Z-axis direction. On the side (tip end side) of the cantilever 10 not supported by the holder 14, a probe 12 is provided. The cantilever 10 and the holder 14 are consumables that wear as the number and duration used to analyze the sample S increases. For this reason, the user needs to periodically replace the cantilever 10 and the holder 14 according to the usage conditions. The surface of the cantilever 10 faces the sample S. The rear surface of the cantilever 10 faces the optical system 20.

The optical system 20 is provided with a laser light source 22, a beam splitter 24, a reflecting mirror 26, and a detector 28.

The laser light source 22 is constituted by a laser oscillator for emitting laser light LA. The laser light LA emitted from the laser light source 22 is reflected by the beam splitter 24 to be emitted to the rear surface of the cantilever 10. The laser light LA emitted to the cantilever 10 is reflected by the rear surface of the cantilever 10 and then reflected by the reflecting mirror 26. The laser light LA reflected by the reflecting mirror 26 is detected by the detector 28. The detector 28 detects the laser light LA reflected by the cantilever 10 and outputs the detected result to the control device 100.

The laser light source 22 is movable along a plane (the YZ plane in the example shown in FIG. 1) perpendicular to the optical axis of the laser light LA to be outputted. The control device 100 moves the laser light source 22 to adjust the optical axis of the laser light LA such that the laser light LA is reflected by the cantilever 10.

The detector 28 is movable along the plane (the YZ plane in the example shown in FIG. 1) perpendicular to the optical axis of the incident laser light LA. The control device 100 moves the detector 28 to adjust the position of the detector 28 such that the laser light LA reflected by the cantilever 10 is incident on the center of the light-receiving surface of the detector 28.

The scanner 50 is formed in a cylindrical shape. The sample S is held by the sample holding unit 52 mounted on the scanner 50. The scanner 50 includes an XY scanner that scans the sample S in the X-axis direction and the Y-axis direction and a Z scanner that finely moves the sample S along the Z-axis. Thus, the scanner 50 is driven three-dimensionally by the XY scanner and the Z scanner.

The imaging unit 60 is arranged above the probe 12 to image the cantilever 10 from above the cantilever 10. The imaging unit 60 images the subject present in the imaging field of view to acquire the image information. The imaging unit 60 includes, as its main parts, an optical system, such as, e.g., a lens and a diaphragm, and a light-receiving element, such as, e.g., a CCD (Charge Coupled Device) image sensor and a CMOS (Complementary Metal Oxide Semiconductor) image sensor. The imaging unit 60 outputs the acquired image information to the control device 100. The image information acquired by the imaging unit 60 is used, for example, to adjust the optical axis of the laser light LA.

The imaging unit 70 images the sample S and the probe 12 from the lateral direction (the X-axis direction in the example shown in FIG. 1). The imaging unit 70 images the subject present in the imaging field of view to acquire the image information. The imaging unit 70 includes, as its main elements, an optical system, such as, e.g., a lens and a diaphragm, and a light-receiving element, such as, e.g., a CCD image sensor and a CMOS image sensor. The imaging unit 70 outputs the acquired image information to the control device 100.

The observation device 200 configured as described above is an atomic force microscope (AFM) among SPMs. The observation device 200 oscillates the cantilever 10 in the vertical direction while utilizing the atomic force (attractive or repulsive force) acting between the probe 12 and the surface of the sample S, under the control of the control device 100. The control device 100 detects the laser light LA reflected by the cantilever 10 during oscillation to acquire the information on the surface of the sample S.

The control device 100 is exemplified by a computer configured in accordance with general-purpose computer architecture. The control device 100 controls the operation of each part constituting the observation device 200 and also provides the user with the information on the part used to analyze the sample S by the analyzer 1. The control device 100 is configured in accordance with, for example, the general-purpose computer architecture. Note that the control device 100 may be implemented using hardware dedicated to the analyzer 1. The control device 100 is provided with a processor 102, a communication device 103, a memory 104, a display device 105, and an input device 106.

The processor 102 is an arithmetic entity (computer) that performs various kinds of processing according to various programs (for example, the display control program 141 and the analysis program 142, which will be described later). The processor 102 may be configured by, for example, at least one of a CPU (Central Processing Unit), an FPGA (Field Programmable Gate Array), a GPU (Graphics Processing Unit), and an MPU (Multi Processing Unit). Note that the processor 102 may be configured by processing circuitry.

The processor 102 analyzes the sample S by analyzing the detection result of the laser light LA acquired by the observation device 200 according to the analysis program 142. The processor 102 controls the display device 105 in accordance with the display control program 141 to cause the display device 105 to display predetermined information (predetermined image), such as, e.g., the supplier information. The processor 102 performs various processing based on the input by the user acquired from the input device 106. The processor 102 controls the communication device 103 to cause the communication device 103 to transmit and receive data (information) between the server device 300 and each of the supplier terminals 400.

The communication device 103 transmits and receives data (information) between the server device 300 and each of the supplier terminals 400 via wired or wireless connectivity.

The memory 104 is configured by a volatile memory, such as, e.g., a DRAM (Dynamic Random Access Memory) and an SRAM (Static Random Access Memory), or a nonvolatile memory, such as, e.g., a ROM (Read Only Memory). The memory 104 stores various programs, such as, e.g., a display control program 141 for providing the user with the information on the part used to analyze the sample S and an analysis program 142 for controlling the observation device 200, and data.

Note that the memory 104 is not particularly limited as long as the control device 100 can non-temporarily record programs and data in a readable format. For example, the memory 104 can be exemplified by a CD-ROM (Compact Disc-Read Only Memory), a DVD-ROM (Digital Versatile Disk-Read Only Memory), a USB (Universal Serial Bus) memory, a memory card, an FD (Flexible Disk), an HDD (Hard Disk Drive), an SSD (Solid State Drive), a magnetic tape, a cassette tape, an MO (Mini Optical Disc), an MD (Mini Disc), an IC (Integrated Circuit) card, an optical card, a mask ROM, or an EPROM.

The display device 105 includes a display, such as, e.g., a liquid crystal display, a plasma display, and an organic EL (Electro Luminescence) display, and displays predetermined information based on the control of the processor 102. For example, the display device 105 displays the analysis result of the sample S acquired based on the observation result of the sample S by the observation device 200, or displays the supplier information on the part when the replacement time of the part has come.

The input device 106 is an input interface for accepting inputs from the user, such as, e.g., a keyboard and a mouse. The input device 106 outputs a signal based on the accepted input from the user to the processor 102. Note that the control device 100 may be provided with a touch panel in which the display device 105 and the input device 106 are integrated.

The server device 300 is, for example, a computer configured in accordance with general-purpose computer architecture. The server device 300 is provided with a processor 302, a communication device 303, and a memory 304.

The processor 302 is an arithmetic entity (computer) that performs various kinds of processing according to various programs (for example, the information provision program 341 which will be described later). The processor 302 is configured by, for example, at least one of a CPU, an FPGA, a GPU, and an MPU. Note that the processor 302 may be composed of arithmetic circuits.

The processor 302 controls the communication device 303 in accordance with various programs, such as, e.g., an information provision program, to cause the communication device 303 to transmit and receive data (information) between the control device 100 and each of the supplier terminals 400.

The communication device 303 transmits and receives data (information) between the control device 100 of the analyzer 1 and each of the supplier terminals 400 via wired or wireless connectivity.

The memory 304 is configured by a volatile memory, such as, e.g., a DRAM and an SRAM, or a nonvolatile memory, such as, e.g., a ROM. The memory 304 stores various programs, such as, e.g., an information provision program 341 for providing a user with the information on the part used to analyze the sample S and data.

The memory 304 may be a CD-ROM, a DVD-ROM, a USB memory, a memory card, an FD, an HDD, an SSD, a magnetic tape, a cassette tape, an MO, an MD, an IC card, an optical card, a mask ROM, or an EPROM as long as the server device 300 can record programs and data non-temporarily in a readable format.

[Functional Configuration of Information Providing System 1000]

Figure 4:
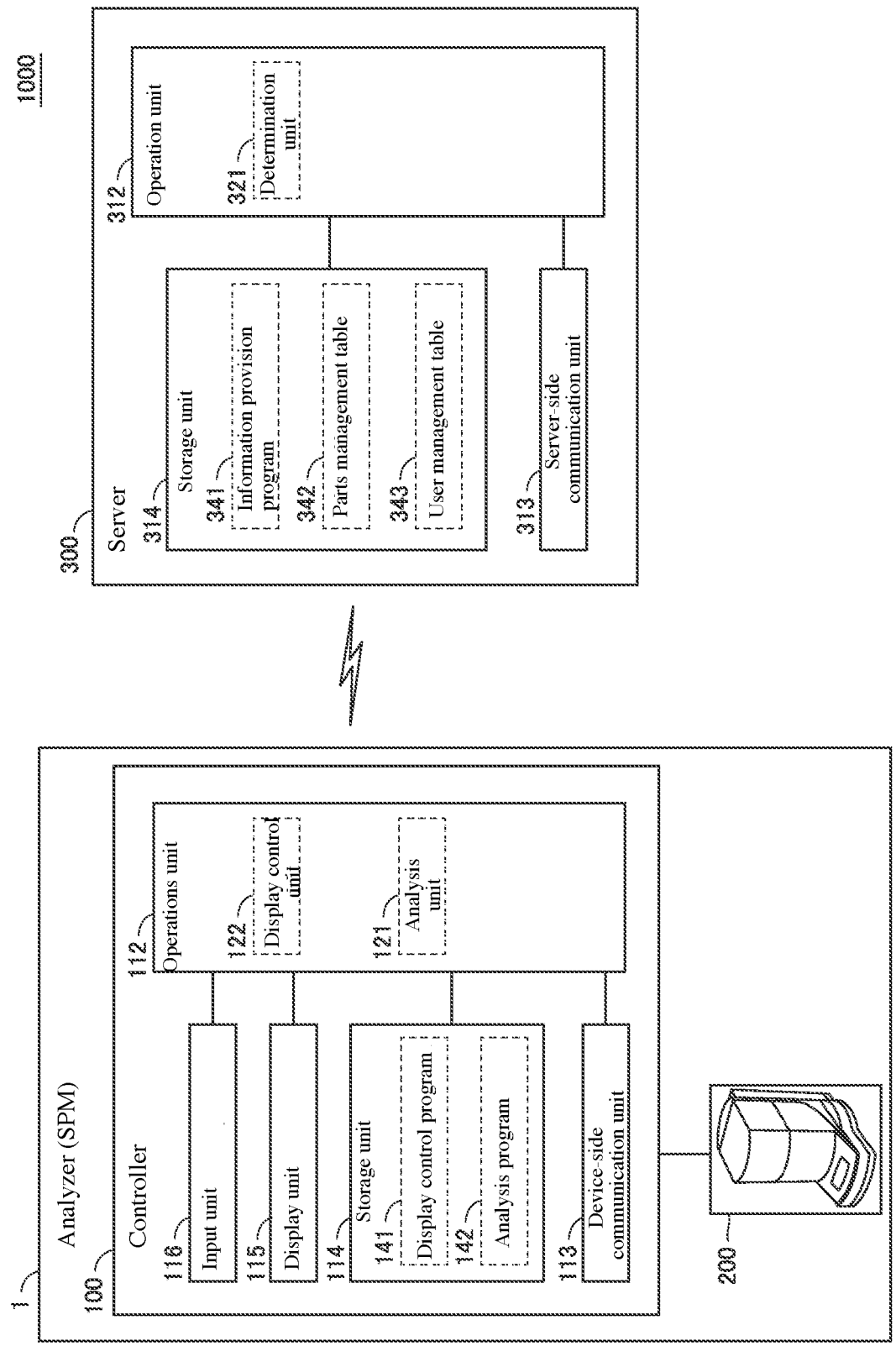
FIG. 4 is a diagram showing the functional configuration of the information providing system according to the embodiment.

FIG. 4 is a diagram showing a functional configuration of the information providing system 1000 according to this embodiment. As shown in FIG. 4, the control device 100 of the analyzer 1 is provided with, as its main functional parts, an operation unit 112, a device-side communication unit 113, a storage unit 114, a display unit 115, and an input unit 116.

The operation unit 112 is a functional part of the processor 102 and executes various processing related to the analyzer 1. Specifically, the operation unit 112 includes an analysis unit 121 and a display control unit 122. The analysis unit 121 analyzes a sample S by analyzing the result of the laser light LA acquired by the observation device 200 according to the analysis program 142. The display control unit 122 controls the display device 105 (display unit 115) in accordance with the display control program 141. In addition, the operation unit 112 performs various processing based on the user's input acquired from the input unit 116 and controls the device-side communication unit 113 to cause the device-side communication unit 113 to transmit and receive data (information) between the server device 300 and each of the supplier terminals 400.

The device-side communication unit 113 is a functional part of the communication device 103 and transmits and receives data (information) between the server device 300 and each of the supplier terminals 400.

The storage unit 114 is a functional unit of the memory 104 and stores various kinds of programs, data, etc. In particular, the storage unit 114 stores a display control program 141 for providing a user with the information on the part used to analyze the sample S, and an analysis program 142 for analyzing the sample S.

The display unit 115 is a functional part of the display device 105 and displays predetermined information (predetermined image), such as, e.g., supplier information based on the control of the operation unit 112.

The input unit 116 is a functional part of the input device 106 and receives an input by a user and outputs a signal based on the received input from the user to the operation unit 112.

The server device 300 is provided with an operation unit 312, a server-side communication unit 313, and a storage unit 314.

The operation unit 312 is a functional part of the processor 302 and performs various kinds of operations related to the server device 300. Specifically, the operation unit 312 is provided with a determination unit 321. The determination unit 321 determines, according to the information provision program 341, whether or not the part used to analyze the sample S needs to be replaced. In addition, the operation unit 312 controls the server-side communication unit 313 to cause the server-side communication unit 313 to transmit and receive data (information) between the control device 100 of the analyzer 1 and each of the supplier terminals 400.

The server-side communication unit 313 is a functional part of the communication device 303 and transmits and receives data (information) between the control device 100 of the analyzer 1 and each of the supplier terminals 400.

The storage unit 314 is a functional part of the memory 304 and stores various kinds of programs, data, etc. In particular, the storage unit 314 stores the information provision program 341 for providing a user with the information on the part used to analyze the sample S, a parts management table 342 including information for managing parts, and a user management table 343 including information for managing a user.

[Parts Management Table]

FIG. 5 is a diagram for explaining a parts management table 342 stored in the server device 300 according to this embodiment. The parts management table 342 stores information for managing parts used to analyze a sample S by the observation device 200 of the analyzer 1. The analyzer 1 according to this embodiment, which is an SPM, is provided with a cantilever 10 and a holder 14 as the parts used to analyze a sample S. In this embodiment, when the cantilever 10 or the holder 14 needs to be replaced, the supplier information on the supplier of the cantilever 10 or the holder 14 is provided to the user by the display device 105 of the control device 100.

As shown in FIG. 5, the parts management table 342 includes a "Parts" column, a "Supplier" column, and an "Ordering address" column. The "Parts" column stores the information for specifying the type of the part. The "Supplier" column stores the information for specifying the supplier. The "Ordering address" column stores the information for specifying the address for the user to order the part to the supplier.

In the embodiment of this example, a plurality of types of cantilevers 10, such as, e.g., a cantilever A to a cantilever E, is provided. For the supplier of the cantilever 10, there are several types of parts manufacturers, such as, e.g., a parts manufacturer A to a parts manufacturer C. Depending on the type of the cantilever 10, the supplier varies.

For example, as shown in FIG. 5, as the supplier of the cantilever A, there are two types of parts manufacturers, such as, e.g., a parts manufacturer A and a parts manufacturer B. As the supplier of the cantilever B, there is only one type of a parts manufacturer, such as, e.g., the parts manufacturer B.

Further, in the embodiment of this example, there is a plurality of types of holders 14, such as, e.g., a holder A to a holder E. As for the suppliers of the holder 14, there are a device manufacturer of the analyzer 1 in which the server device 300 is installed and a plurality of types of parts manufacturers, such as, e.g., a parts manufacturer A to a parts manufacturer C. Depending on the type of the holder 14, the supplier varies.

For example, as shown in FIG. 5, as for the supplier of the holder A, there is a device manufacturer. As for the supplier of the holder D, there are two types of parts manufacturers, such as, e.g., a parts manufacturer A and a parts manufacturer C.

As long as the part (the cantilevers A to E, the holders A to E in this embodiment) used in the analyzer 1 of the user can be specified, the server device 300 can acquire the supplier information corresponding to the specified part based on the parts management table 342.

[User Management Table]

FIG. 6 is a diagram for explaining a user management table 343 stored in the server device 300 according to this embodiment. The user management table 343 stores the information for managing the user of the analyzer 1.

As shown in FIG. 6, the user management table includes a "User" column, a "Parts" column, a "Purchase history" column, an "Elapsed period from the last time" column, an "Average interval period" column, a "Replacement flag" column, and a "Suggested supplier" column.

The "User" column stores the information for identifying the user. The information for identifying the user includes a unique user ID (identification) that identifies the user, a password, a name, an address, and a telephone number, etc., of the user.

The "Parts" column stores the information for specifying the type of the part that is being used by the user. For example, for the user A, the "Parts" column stores the information for specifying that the cantilever A and the holder A are being used. For the user B, the "Parts" column stores the information for specifying that the cantilever A, the cantilever B, and the holder D are being used. The information for specifying parts is exemplified by a serial number, a model type, etc., unique to the part to identify the part.

The "Purchase history" column stores the information for specifying the purchase history of the part by the user. For example, for the user A, the "Purchase history" column stores the information for specifying that the cantilever A was purchased from the parts manufacturer A and the purchase dates. For the user B, the "Purchase history" column stores the information for specifying that the holder A was purchased from the device manufacturer and the purchase dates. For the user B. the "Purchase history" column stores the information for specifying that the cantilever A was purchased from the parts manufacturer A and the parts manufacturer B and the purchase dates. For the user B, the "Purchase history" column stores the information for specifying that the cantilever B was purchased from the parts manufacturer B and the purchase dates. For the user B, the "purchase history" column stores the information for specifying that the holder D was purchased from the parts manufacturer C and the purchase dates.

The "Elapsed period from the last time" column stores the information for specifying the period of time that has passed since the last purchase of the part by the user. For example, for the user A, the "Elapsed period from the last time" column stores the information for specifying that 70 days have passed since the last purchase of the cantilever A and that 31 days have passed since the last purchase of the holder A. For the user B, the "Elapsed period from the last time" column stores the information for specifying that 50 days have elapsed since the last purchase of the cantilever A, 75 days have passed since the last purchase of the cantilever B and that 162 days have passed since the last purchase of the holder D.

The "Average interval period" column stores the information for specifying the average interval period from the time of the last purchase calculated from the purchase history. For example, for the user A, the "Average interval period" column stores the information for specifying that the cantilever A was purchased again after the elapse of average 63 days since the last purchase of the cantilever A and that the holder A was purchased again after the elapse of average 165 days since the last purchase of the holder A. For the user B, the "Average interval period" column stores the information for specifying that the cantilever A was purchased again after the elapse of average 42 days since the last purchase of the cantilever A, the cantilever B was purchased again after the elapse of average 85 days since the last purchase of the cantilever B, and that the holder D was purchased again after the elapse of average 155 days since the last purchase of the holder D.

The "Replacement flag" stores the information for specifying whether or not the part needs to be replaced, the information being calculated from the "elapsed period from the last time" and the "average interval period." For example, when the "elapsed period from the last time" has exceeded the "average interval period," the "replacement flag" stores "1" indicating that the part needs to be replaced. When the "elapsed period from the last time" has not exceeded the "average interval period," the "replacement flag" stores "0" indicating that the part needs to be replaced.

Note that in this embodiment, the server device 300 determines whether or not the part needs to be replaced based on the "elapsed period from the last time" and the "average interval period," but may determine whether or not the part needs to be replaced by another method. For example, the server device 300 may specify that the part needs to be replaced when the elapsed period from the last purchase date to the present has exceeded the elapsed period between the date and time two times before the last purchase and the date and time of the last purchase.

The "Suggested supplier" column stores the information for specifying the supplier to be proposed to the user by the server device 300 based on the part purchase history. For example, for the cantilever A of the user A, the "Suggested supplier" column stores the information for specifying that the parts manufacturer A with a purchase record is to be proposed as the supplier. For the holder A of the user A, the "Suggested supplier" column stores the information for specifying that the device manufacturer with a purchase record is to be proposed as the supplier. For the cantilever A of the user B, the "Suggested supplier" column stores the information for specifying that the parts manufacturer B with a purchased record is to be proposed as the supplier between the parts manufacturer A with a purchase record and the parts manufacturer B with a purchase record. For the cantilever B of the user B, the "Suggested supplier" column stores the information for specifying that the parts manufacturer B with a purchase record is to be proposed as the supplier. For the holder D of the user B, the "Suggested supplier" column stores the information for specifying that the parts manufacturer C with a purchase record is to be proposed as the supplier.

When the user can be specified, the server device 300 can specify whether or not the part needs to be replaced and a supplier to be proposed when the part needs to be replaced, based on the user management table 343, for each part used by the specified user. Further, referring to the parts management table 342 shown in FIG. 5, the server device 300 can acquire the ordering address of the proposed supplier.

[Steps of Analysis]

Figure 7:
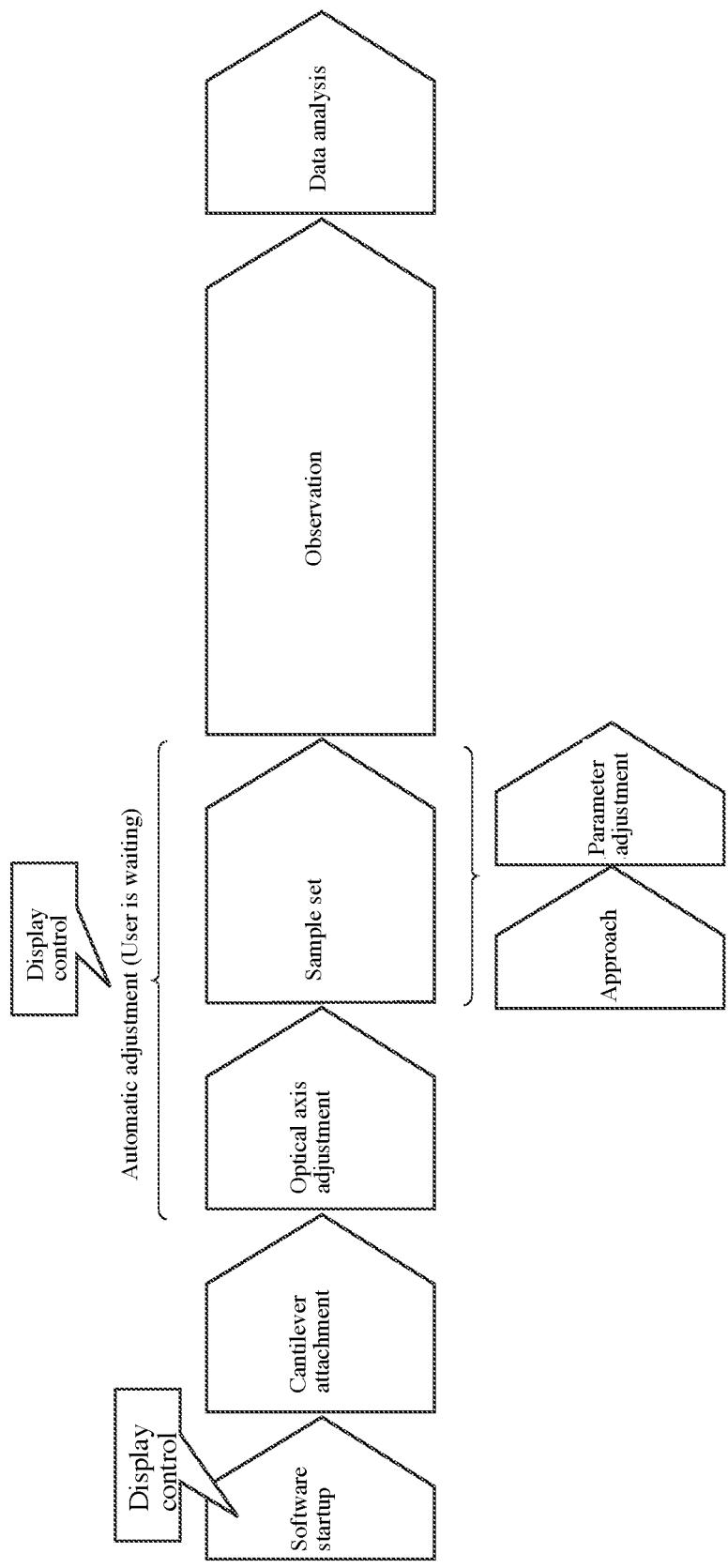
FIG. 7 is a diagram showing one example of steps of analyzing a sample according to the analyzer.

FIG. 7 is a diagram showing an example of steps of analyzing a sample S according to the analyzer 1. In this embodiment, when a sample S is analyzed using the analyzer 1, which is an SPM, the steps as shown in FIG. 7 are performed.

As shown in FIG. 7, the steps related to the analysis include a software startup step, a cantilever attachment step, an optical axis adjustment step, a sample set step, an observation step, and a data analysis step.

Figure 8:
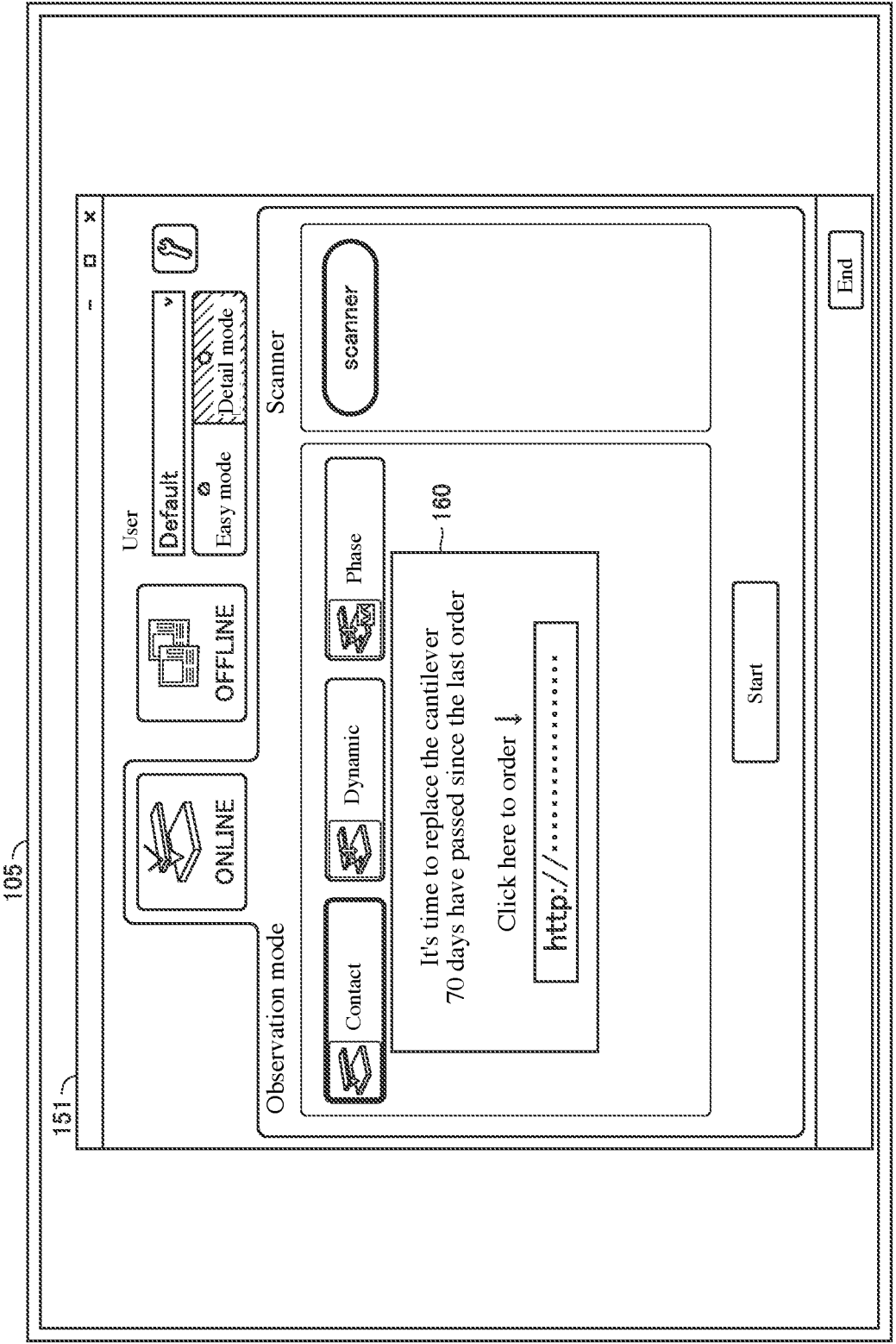
FIG. 8 is a diagram showing an example of a screen of a display device at the startup of software.

First, a software startup step is performed. The software startup step is performed by performing the analysis program 142 by the control device 100 according to the user inputs. When the software for the analysis is started, a software startup screen is displayed on the display device 105 as shown in FIG. 8, which will be described later.

After starting the analytical software, a cantilever attachment step is performed. In the cantilever attachment step, the user attaches the cantilever 10 to the holder 14 of the observation device 200.

After the cantilever attachment step, an optical axis adjustment step is performed. The optical axis adjustment step is a step of adjusting the optical axis for detecting the movements of the cantilever 10. The optical axis adjustment step is performed automatically by the control device 100 without the involvement of the user. Specifically, in the optical axis adjustment step, the control device 100 controls the observation device 200 such that the position (the position where the amount of light received is the largest) of the laser light LA reflected by the cantilever 10 is incident on the center of the light-receiving surface of the detector 28 to adjust the optical system 20 automatically.

After the optical adjustment step, a sample set step is performed. The sample set step includes, in addition to a step of setting the sample by the user, an approach step and a parameter adjustment step. The approach step and the parameter adjustment step are performed automatically by the control device 100 without the involvement of the user.

The approach step is a step of bringing the probe 12 closer to the surface of the sample S. Specifically, in the approach step, the probe 12 is brought closer at a slow speed (e.g., at a speed of 1 mm/min) toward the sample S from a height (the height in the Z-axis direction shown in FIG. 3) preset by the user. When the probe 12 has been brought within a predetermined range of the sample S, an atomic force is generated between the probe 12 and the surface of the sample S. When the control device 100 detects the atomic force generated between the probe 12 and the surface of the sample S, the approach step is completed.

The approach step is followed by a parameter adjustment step. The parameter adjustment step is a step of adjusting the parameter for analyzing the sample. For example, in the parameter adjustment step, the feedback gain for performing the distance control is automatically adjusted between the probe 12 and the sample S.

After the sample set step, the observation step is performed. In the observation step, the cantilever 10 equipped with the probe 12 scans along the surface of the sample S to acquire the information on the surface of the sample S.

After the observation step, the data analysis step is performed. In the data analysis step, the sample S is analyzed by the control device 100 based on the detection result of the observation device 200 acquired in the observation step.

In the steps described above, the control device 100 performs the display control program 141 to perform the display control for the display device 105. Specifically, the control device 100 performs the display control in the software startup step, the optical axis adjustment step, and the sample set step (the approach step, the parameter adjustment step). In particular, of the steps of analyzing the sample S, the optical axis adjustment step, the approach step, and the parameter adjustment step are performed automatically by the control device 100 and the observation device 200. For this reason, in these steps, there occurs a time during which the user has to wait. In such a waiting time that may stress the user, the display control is performed.

Note that, like the optical axis adjustment step, the approach step, and the parameter adjustment step described above, in the automatic adjustment step performed by the control device 100, the time required for such an automatic adjustment varies. For example, in the approach step, the time until the probe 12 is brought within the predetermined range of the sample S is determined depending on the height of the probe 12 set by the user and the thickness of the sample S (the thickness in the Z-axis shown in FIG. 3). For this reason, depending on the height of the probe 12 set by the user and the thickness of the sample S, it may take longer for the user to wait in the approach step. The control device 100 is configured to perform the display control in the waiting time of the user that varies according to such a situation.

[Example of Display Control]

Referring to FIGS. 8 to 11, an example of the display control for the display device 105 according to the control device 100 will be described.

(Display Control at Startup of Software)

FIG. 8 is a diagram showing an example of a screen of the display device 105 at the startup of software. As shown in FIG. 8, when the analysis software starts, the display device 105 displays a software startup screen 151 under the control of the control device 100.

The display device 105 displays, in a portion of the software startup screen 151, a part-related image 160 including the information on a part used to analyze the sample S. The part-related image 160 includes the information for prompting the replacement of the part, the information on the supplier of the part, and the information on the degree of consumption of the part. Note that as shown in FIG. 6, the example shown in FIG. 8 is an example in which the information on the cantilever A is provided to the user A.

For example, the part-related image 160 includes a message "It's time to replace the cantilever" as the information for prompting the replacement of the part. The part-related image 160 includes the supplier address along with the message "Click here to order" as the information on the supplier of the part. The part-related image 160 includes the message "70 days have passed since the last order" as the information on the degree of consumption of the part. Note that the part-related image 160 is not limited to the example shown in FIG. 8 and may include other information as the information for prompting the replacement of the part, the information on the supplier of the part, and the information on the degree of consumption of the part. The part-related image 160 is not limited to the cantilever 10 and may include the information for prompting the replacement of other parts (consumables), such as, e.g., the holder 14.

In this manner, the analyzer 1 displays the supplier information on the supplier of the part on the display device 105 when the part needs to be replaced at the startup of the software. With this, the user itself is not required to determine whether or not the part, such as, e.g., the cantilever 10, needs to be replaced and search the supplier of the part when the part needs to be replaced. Therefore, the analyzer 1 can make the user analyze the sample S while providing convenience to the user. In the parts manufacturer as well, the user itself places the order for the part based on the supplier information displayed on the display device 105, which enables the parts manufacturer can smoothly receive the order without being traded with other manufacturers of parts.

(Display Control During Optical Axis Adjustment)

Figure 9:
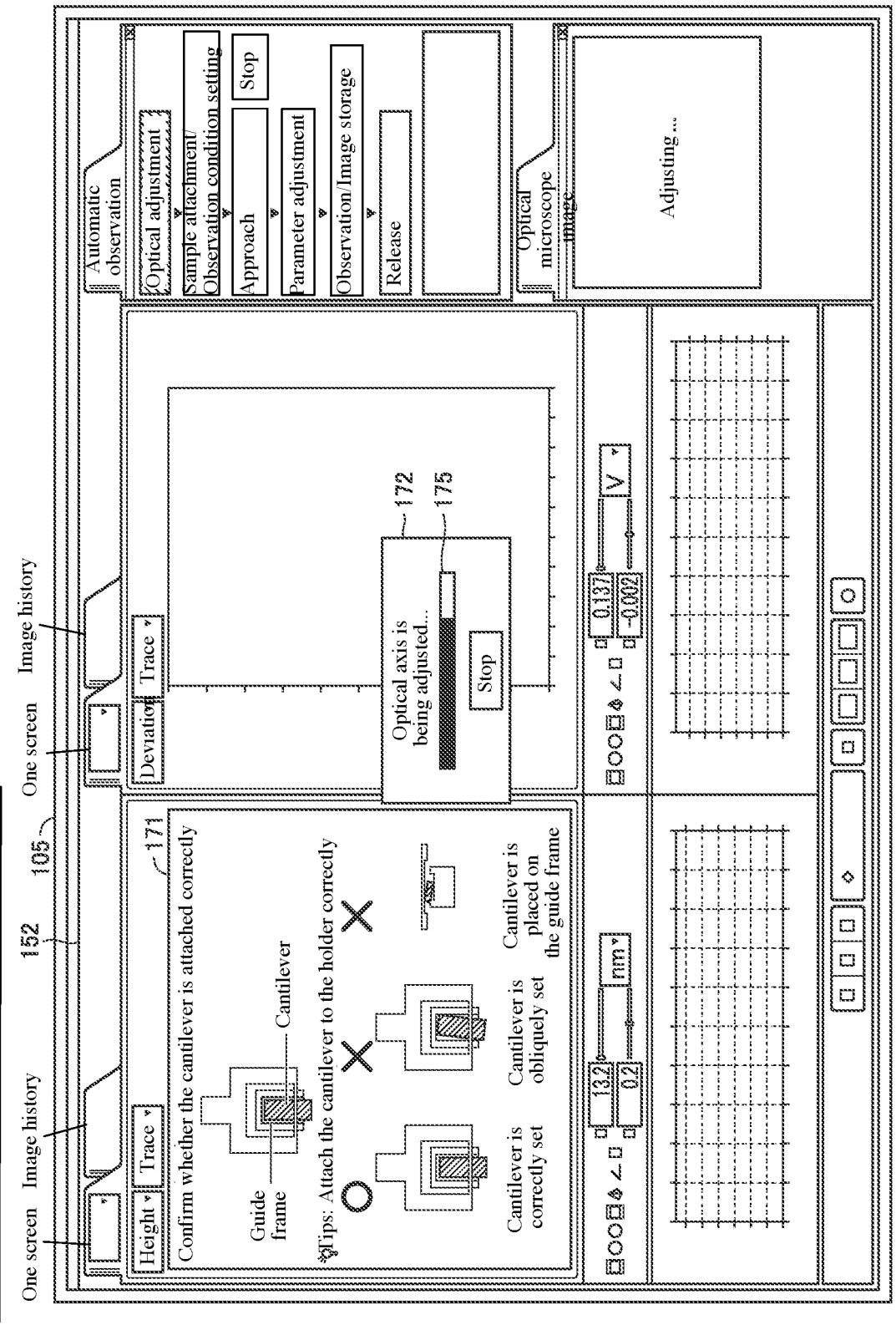
FIG. 9 is a diagram showing an example of a screen of the display device during the optical axis adjustment.

FIG. 9 is a diagram showing an example of a screen of the display device 105 during the optical axis adjustment. As shown in FIG. 9, in the optical axis adjustment step, the display device 105 displays the optical axis adjustment screen 152 based on the control of the control device 100.

The display device 105 displays, in a portion of the optical axis adjustment screen 152, an advice image 171 including the information on the advice of the analysis of the ample S. For example, the advice image 171 includes a message and a diagram for prompting the user to confirm that the cantilever 10 is correctly attached to the holder 14. Note that the advice image 171 is not limited to the example shown in FIG. 9 and may include other information as the information on the advice relating to the analysis of the sample S.

As described above, the analyzer 1 displays the information on the advice of the analysis of the sample S on the display device 105 in a step in which the user is waiting, such as, e.g., a step in which the optical axis is being adjusted. This ensures that the user will not get bored with the waiting time as much as possible. Therefore, the analyzer 1 can make the user analyze the sample without stressing the user as much as possible.

The display device 105 displays, in a portion of the optical axis adjustment screen 152, the progress image 172 including the information on the progress of the analysis of the sample S. For example, the progress image 172 includes a progress bar 175 indicating the progress status, along with the message "Optical axis is being adjusted . . . " indicating the currently ongoing step. Note that the progress image 172 is not limited to the example shown in FIG. 9 and may include other information as the information on the progress of the analysis of the sample S. For example, the progress image 172 may include a spinner image 185 as shown in FIG. 10 as the information on the progress of the analysis of the sample S.

In this way, the analyzer 1 displays the information on the progress of the analysis of the sample S on the display device 105 in the step in which the user is waiting, such as, e.g., the step in which the optical axis is being adjusted. As a result, the analyzer 1 can make the user analyze the sample without stressing the user as much as possible.

(Display Control During Approach)

Figure 10:
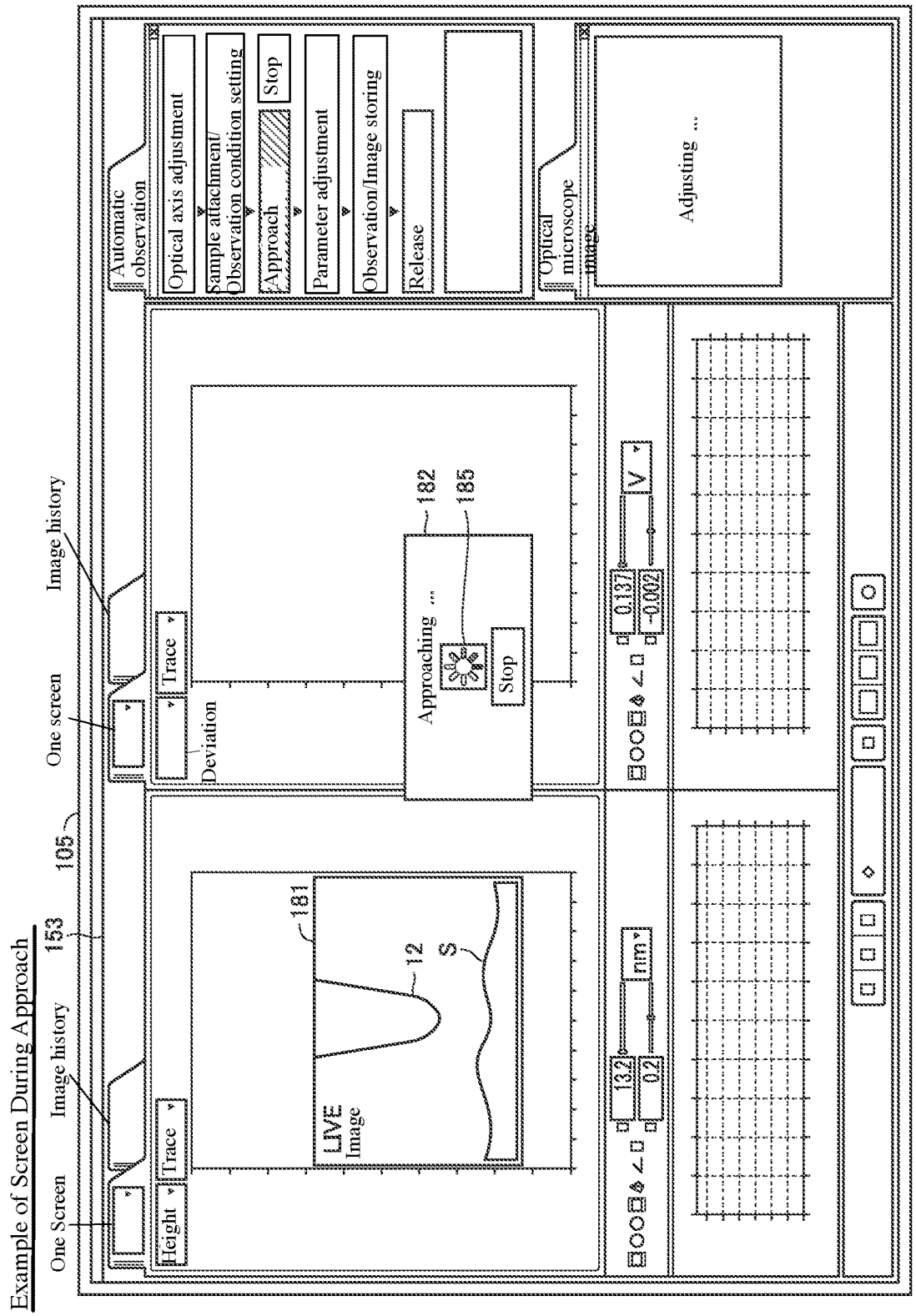
FIG. 10 is a diagram showing an example of the screen of the display device during the approach.

FIG. 10 is a diagram showing an example of a screen of the display device during the approach. As shown in FIG. 10, in the approach step, the display device 105 displays the approach screen 153 based on the control of the control device 100.

The display device 105 displays, in a portion of the approach screen 153, a live image 181 imaging the step of analyzing the sample S. For example, the live image 181 includes a still image or a moving image captured by the imaging unit 70, the image showing the probe 12 approaching the sample S in the approach step. Note that the live image 181 is not limited to the example shown in FIG. 10 and may include other images as the image acquired by imaging the step of analyzing the sample S. For example, the live image 181 may include an image animating a step (e.g., approach step) of analyzing the sample S.

In this manner, the analyzer 1 displays the image in which the step of analyzing the sample S is captured on the display device 105 in the step in which the user is waiting, such as, an approaching step. This ensures that the user will not get bored with the waiting time as much as possible. Therefore, the analyzer 1 can make the user analyze the sample without stressing the user as much as possible.

The display device 105 displays, in a portion of the approach screen 153, a progress image 182 including the information on the progress of the analysis of the sample S. For example, the progress image 182 includes a spinner image 185 indicating the progress state along with the message "Approaching . . . " indicating the currently ongoing step. Note that the progress image 182 is not limited to the example shown in FIG. 10 and may include other information as the information on the progress of the analysis of the sample S. For example, the progress image 182 may include the progress bar 175 as shown in FIG. 9 as the information on the progress of the analysis of the sample S.

As described above, the analyzer 1 displays the information on the progress of the analysis of the sample S on the display device 105 in the step in which the user is waiting, such as, e.g., the approaching step. With this, the analyzer 1 can make the user analyze the sample without stressing the user as much as possible.

(Display Control During Parameter Adjustment)

Figure 11:
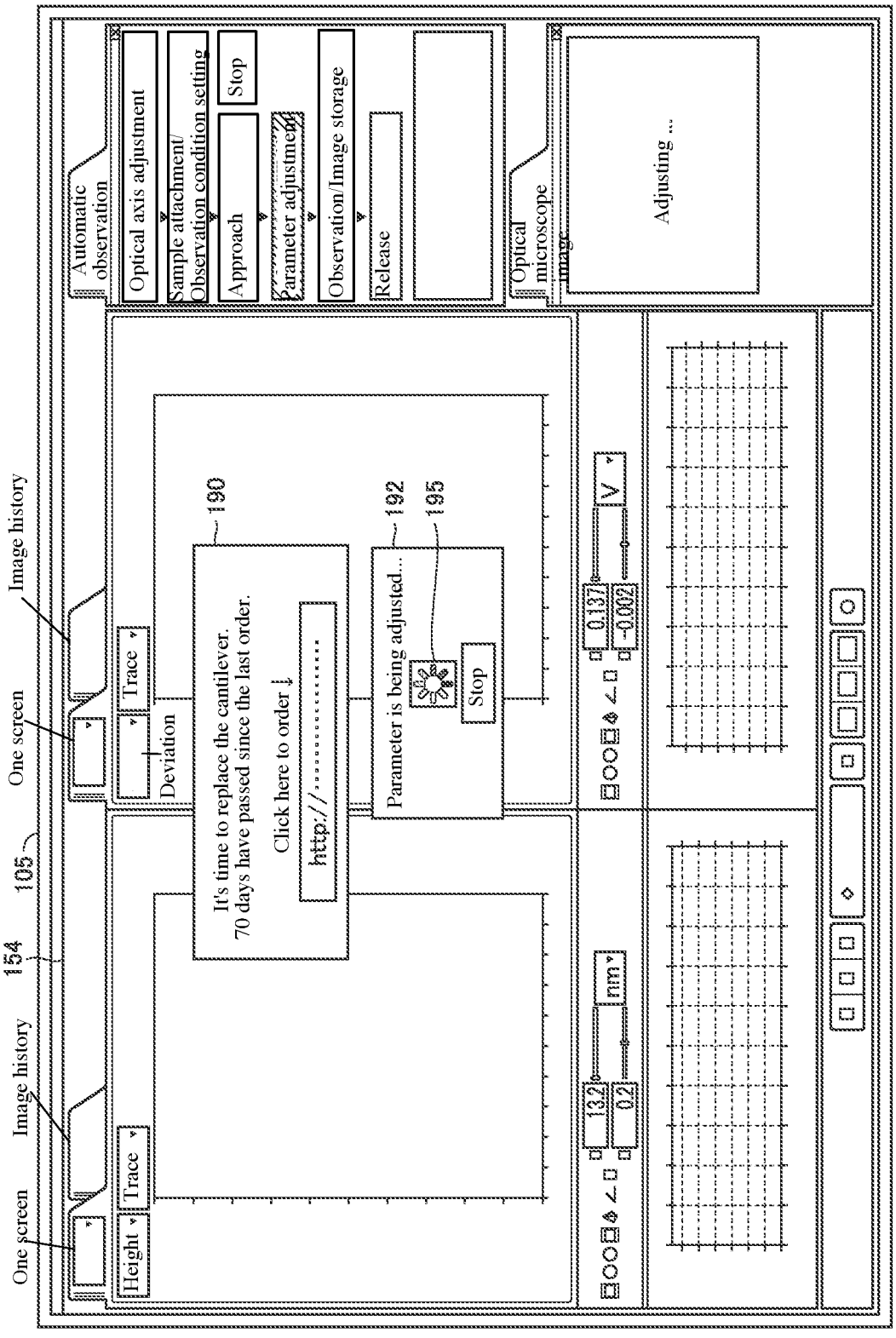
FIG. 11 is a diagram showing an example of the screen of the display device during the parameter adjustment.

FIG. 11 is a diagram showing an example of a screen of the display device during the parameter adjustment. As shown in FIG. 11, in the parameter adjustment step, the display device 105 displays the parameter adjustment screen 154 based on the control by the control device 100.

The display device 105 displays, in a portion of the parameter adjustment screen 154, a part-related image 190 including the information on the part used to analyze the sample S. The part-related image 190 includes the information for prompting the replacement of a part, the information on the supplier of the part, and the information on the degree of consumption of the part. As shown in FIG. 6, the example shown in FIG. 11 is an example in which the information on the cantilever A is provided to the user A.

For example, the part-related image 190 includes the message "It's time to replace the cantilever" as the information for prompting the user to replace the part. The part-related image 190 includes the supplier addresses along with the message "Click here to order" as the information on the supplier of the part. The part-related image 190 includes the message "70 days have passed since the last order" as the information on the degree of consumption of the part. Note that the part-related image 190 is not limited to the example shown in FIG. 11 and may include other information as the information for prompting the replacement of the part, the information on the supplier of the part, and the information on the degree of consumption of the part. The part-related image 190 is not limited to the cantilever 10 and may include information for prompting the replacement of other parts, such as, e.g., the holder 14.

In this way, the analyzer 1 displays the supplier information on the supplier of the part on the display device 105 when a part needs to be replaced in a step in which the user is waiting, such as, e.g., a step in which the parameter is being adjusted. With this, the user itself is not required to determine whether or not a part, such as, e.g., the cantilever 10, needs to be replaced and search the supplier of the part when the part needs to be replaced. Therefore, the analyzer 1 can make the user analyze the sample S while providing convenience to the user. In the parts manufacturer as well, since the user by itself places an order of the part based on the supplier information displayed on the display device 105, the parts manufacturer can smoothly receive the order of the part without being traded with another parts manufacturer.

The display device 105 displays, in a portion of the parameter adjustment screen 154, a progress image 192 including the information on the progress of the analysis of the sample S. For example, the progress image 192 includes spinner images 195 indicating the progress along with the message "Parameter is being adjusted . . . " indicating the currently ongoing step. Note that the progress image 192 is not limited to the example shown in FIG. 11 and may include other information as the information on the progress of the analysis of the sample S. For example, the progress image 192 may include the progress bar 175 as shown in FIG. 9 as the information on the progress of the analysis of the sample S.

In this way, the analyzer 1 displays the information on the progress of the analysis of the sample S on the display device 105 in a step in which the user is waiting, such as, e.g., a step in which the parameter is being adjusted. With this, the analyzer 1 can make the user analyze the sample without stressing the user as much as possible.

[Processing for Display Control of Information Providing System]

(Processing for Display Control at Startup of Software)

Figure 12:
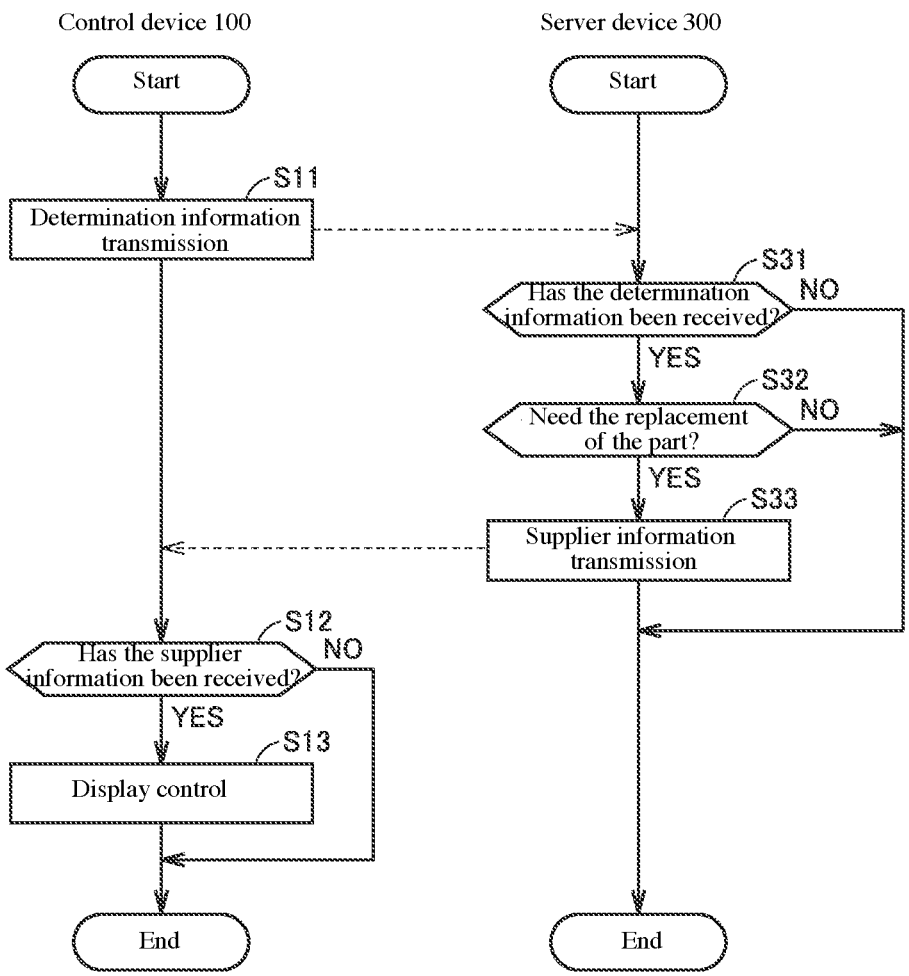
FIG. 12 is a flowchart of the display control at the startup of software performed by the information providing system according to the embodiment.

FIG. 12 is a flowchart of the display control performed by the information providing system 1000 according to this embodiment at the startup of the software. The processing step (hereinafter abbreviated as "S") shown in FIG. 12 is realized by performing the display control program 141 by the processor 102 (operation unit 112) of the control device 100 and performing the information provision program 341 by the processor 302 (operation unit 312) of the server device 300.

As shown in FIG. 12, at the startup of the software, the control device 100 transmits determination information to the server device 300 (S11). The determination information is the information for the server device 300 to determine whether or not a part needs to be replaced. For example, the determination information includes at least one of the information (e.g., an ID, a password, a user name, an address, a telephone number, etc.) for identifying the user of the analyzer 1 and the information (e.g., a serial number, a type, etc.) for specifying the part used by the user.

The server device 300 determines whether or not it has received the determination information (S31). The server device 300 ends the processing when the server device 300 has not received the determination information (NO in S31). When the server device 300 has received the determination information (YES in S31), the server device 300 specifies at least one of the user and the part from the determination information and determines whether or not the target part needs to be replaced based on the user management table 343 (S32). Specifically, the server device 300 determines for the target part based on the information on the replacement flag stored in the user management table 343 that the target part needs to be replaced when the replacement flag is set to "1" and that the target part does not need to be replaced when the replacement flag is set to "0."

When the target part does not need to be replaced (NO in S32), the server device 300 ends the processing. When the target part needs to be replaced (YES in S32), the server device 300 identifies the supplier information based on the parts management table 342 and transmits the identified supplier information to the control device 100 (S33). Specifically, the server device 300 identifies the ordering address and the elapsed time since the last order for the target part based on the parts management table 342 and transmits the supplier information including the identified ordering address and the elapsed time since the last order to the control device 100. Then, the server device 300 ends this processing.

After transmitting the determination information in S11, the control device 100 determines whether or not the control device 100 has received the supplier information in S12. When the control device 100 has not received the supplier information within a predetermined time limit after transmitting the determination information (NO in S12), the control device 100 ends the processing. When the control device 100 has received the supplier information within the predetermined time limit after transmitting the determination information (YES in S12), the control device 100 performs the display control for the display device 105 based on the supplier information (S13).

Specifically, the control device 100 performs the display control for the display device 105 to display the part-related image 160 in a portion of the software startup screen 151 as shown in FIG. 8. Thereafter, the control device 100 ends the processing.

In this manner, the information providing system 1000 (the control device 100 of the analyzer 1, the server device 300) displays the supplier information on the supplier of the part on the display device 105 when the part needs to be replaced at the startup of the software. With this, the information providing system 1000 can make the user analyze the sample S while providing convenience to the user.

Further, the information providing method by the information providing system 1000 includes, at the startup of the software, a step (S32) for determining whether or not the part needs to be replaced and a step (S13) of causing the display unit 105 to display the supplier information on the supplier of the part when the part needs to be replaced. With this, the information providing method can make the user analyze the sample S while providing convenience to the user.

Note that the server device 300 may be configured to notify the supplier of the part of at least one of information indicating that the part needs to be replaced and information (e.g., the type, the production number, the management number, or the like) for identifying the analyzer 1, at the startup of the software when the part needs to be replaced. According to such an information providing method, there is no need for the user itself to contact the supplier of the part.

(Processing on Display Control at the Time of Automatic Adjustment)

Figure 13:
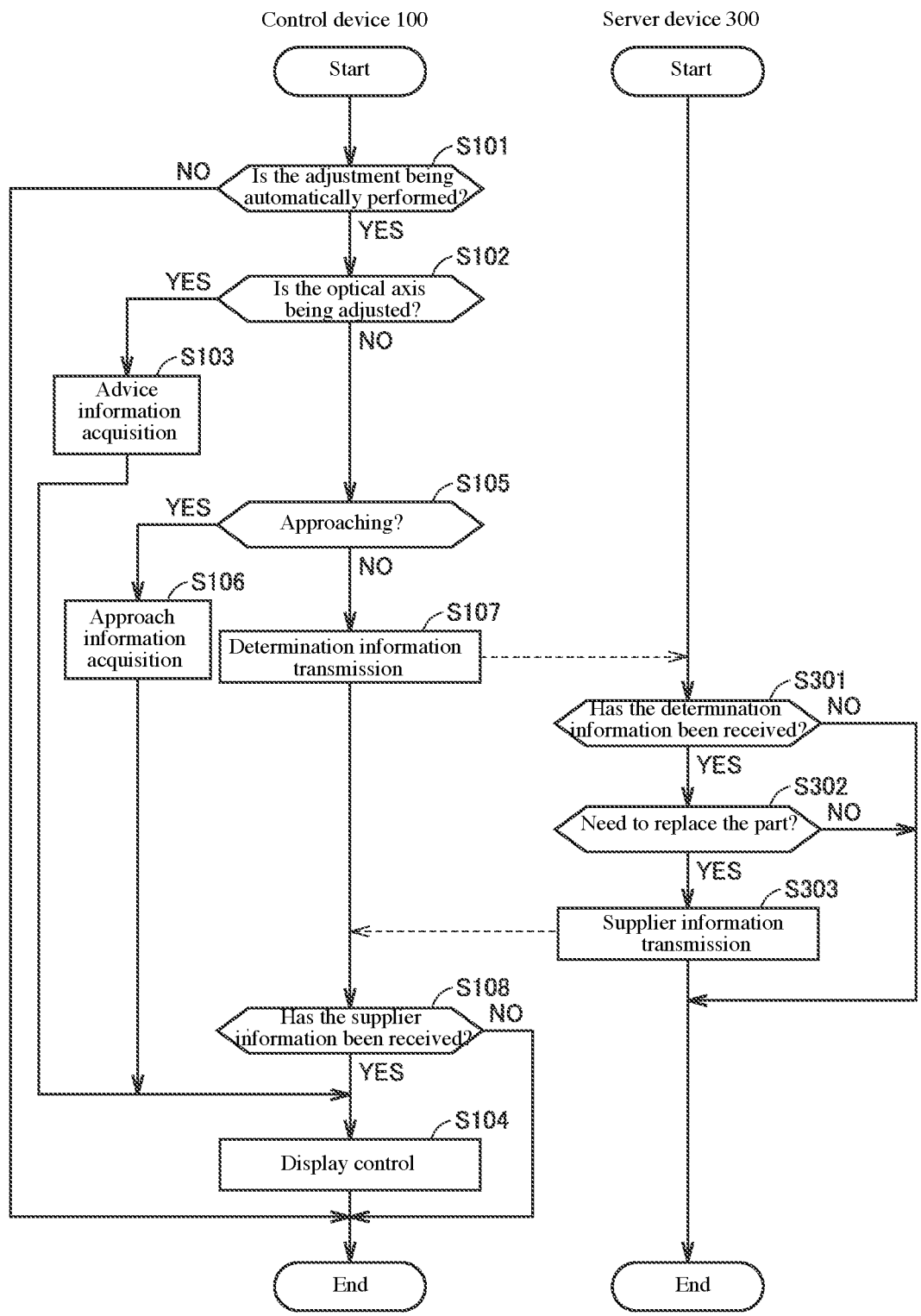
FIG. 13 is a flowchart of the display control at the time of the automatic adjustment performed by the information providing system according to the embodiment.

FIG. 13 is a flowchart of the display control performed by the information providing system 1000 according to this embodiment at the time of the automatic adjustment. The processing step (hereinafter abbreviated as "S") shown in FIG. 13 is realized by performing the display control program 141 by the processor 102 (the operation unit 112) of the control device 100 and performing the information provision program 341 by the processor 302 (the operation unit 312) of the server device 300.

As shown in FIG. 13, the control device 100 determines whether or not the adjustment is being automatically performed (S101). Specifically, the control device 100 determines whether or not the currently ongoing processing is either one of the optical axis adjustment step, the approach step, and the parameter adjustment step. When the control device 100 has determined that the adjustment is not being automatically performed (NO in S101), the control device 100 ends the processing.

When the control device 100 has determined that the adjustment is being automatically adjusted (YES in S101), the control device 100 determines whether or not the optical axis is being adjusted (S102). When the control device 100 has determined that the optical axis is being adjusted (YES in S102), the control device 100 acquires the advice information previously stored in the memory 104 (S103). The advice information includes information on the advice for the analysis of the sample S. Note that at this time, the control device 100 also acquires the information on the progress of the optical axis adjustment step.

The control device 100 performs the display control for the display device 105 based on the information on the progress of the acquired advice information and optical axis adjustment step (S104). Specifically, the control device 100 performs the display control for the display device 105 to display the advice image 171 and the progress image 172 as shown in FIG. 9 in a portion of the optical axis adjustment screen 152. Thereafter, the control device 100 ends the processing.

As described above, the information providing system 1000 (the control device 100 of the analyzer 1, the server device 300) displays the information on the advice of the analysis of the sample S and the information on the progress of the analysis of the sample S on the display device 105 in a step in which the user is waiting, such as, e.g., the step in which the optical axis is being adjusted. With this, the information providing system 1000 can make the user analyze the sample without stressing the user as much as possible.

When the control device 100 determines in S102 that the optical axis is not being adjusted (NO in S102), the control device 100 determines whether or not it is being approached (S105). When it is being approached (YES in S105), the control device 100 acquires the approach information (S106). The approach information includes the information on the image captured in the approach step by the imaging unit 70. Note that at this time, the control device 100 also acquires the information on the progress of the approach step.

The control device 100 performs the display control for the display device 105 based on the acquired approach information and the information on the progress of the approach step (S104). Specifically, the control device 100 performs the display control for the display device 105 to display, in a portion of the approach screen 153 as shown in FIG. 10, the live image 181 and the progress image 182. Thereafter, the control device 100 ends the processing.

In this way, the information providing system 1000 displays, on the display device 105 in the step in which the user is waiting, such as, e.g., the step of approaching, the image in which the step of analyzing the sample S is imaged and the information on the progress of the analysis of the sample S. With this, the information providing system 1000 can make the user analyze the sample without stressing the user as much as possible.

When the control device 100 determines that it is not approaching in S105 (NO in S105), the control device 100 determines that the parameter is being adjusted and transmits the determination information to the server device 300 (S107). The determination information is information for the server device 300 to determine whether or not the part needs to be replaced. For example, the determination information includes at least any one of the information (e.g., an ID, a password, a user name, an address, a telephone number, etc.) for identifying the user of the analyzer 1 and the information (e.g., a serial number, a type, etc.) for identifying the part used by the user.

The server device 300 determines whether or not the determination information has been received (S301). When the server device 300 has not received the determination information (NO in S301), the server device 300 ends the processing. When the server device 300 has received the determination information (YES in S301), the server device 300 identifies at least any one of the user and the part from the determination information and determines whether or not the target part needs to be replaced based on the user management table 343 (S302). Specifically, for the target part, the server device 300 determines that the target part needs to be replaced when the replacement flag is set to "1" and that the target part does not need to be replaced when the replacement flag is set to "0", based on the information on the replacement flag stored in the user management table 343.

When the part does not need to be replaced (NO in S302), the server device 300 ends the processing. When the part needs to be replaced (YES in S302), the server device 300 identifies the supplier information based on the parts management table 342 and transmits the identified supplier information to the control device 100 (S303). Specifically, the server device 300 identifies the ordering address and the elapsed time since the last order for the target part based on the parts management table 342 and transmits the supplier information including the identified ordering address and the elapsed time since the last order to the control device 100. Then, the server device 300 ends the processing.

After transmitting the determination information in S107, the control device 100 determines whether or not the control device 100 has received the supplier information (S108). When the control device 100 has not received the supplier information within a predetermined time limit after transmitting the determination information (NO in S108), the the control device ends the processing. When the control device 100 has received the supplier information within a predetermined time limit after transmitting the determination information (YES in S108), the control device 100 acquires the information on the progress of the parameter adjustment step and performs the display control for the display device 105 based on the acquired supplier information and the information on the progress of the parameter adjustment step (S104).

Specifically, the control device 100 performs the display control for the display device 105 to display, as shown in FIG. 11, in a portion of the parameter adjustment screen 154, the part-related image 190 and the progress image 192. Thereafter, the control device 100 ends the processing.

Thus, the information providing system 1000 (the control device 100 of the analyzer 1, the server device 300) displays the supplier information on the supplier of the part on the display device 105 when the part needs to be replaced in the step which the user is waiting, such as, e.g., the step in which the parameter is being adjusted. With this, the information providing system 1000 can make the user analyze the sample S while providing convenience to the user. Further, the information providing system 1000 displays the information on the progress of the analysis of the sample S on the display device 105 in the step in which the user is waiting, such as, e.g., the step in which the parameter is being adjusted. With this, the information providing system 1000 can make the user analyze the sample without stressing the user as much as possible.

Further, the information providing method by the information providing system 1000 includes a step (S302) for determining whether or not the part needs to be replaced at the time of the automatic adjustment and a step (S104) for causing the display device 105 to display the supplier information on the supplier of the part when the part needs to be replaced. With this, the information providing method can make the user analyze the sample S while providing convenience to the user.

Note that the server device 300 may be configured to notify the supplier of the part of at least one of the information indicating that the part needs to be replaced and the information (e.g., the type, the production number, the management number, or the like) for identifying the analyzer 1 at the time of the automatic adjustment when the part needs to be replaced. According to such an information providing method, there is no need for the user itself to contact the supplier of the part.

Modified Embodiment

Although the analyzer 1, the server device 300, and the information providing system 1000 according to this embodiment have been described above, various modifications and applications can be made in these configurations. Hereinafter, the modifications will be described below.
(Configuration of Analyzer)

In this above-described embodiment, although the analyzer 1 is a scanning probe microscope (SPM), the analyzer 1 is not limited to an SPM. For example, the analyzer 1 may be other analyzers in which a part used to analyze a sample needs to be replaced is used. The analyzer 1 may be other analyzers configured to perform a step in which the user is required to wait as a step of analyzing a sample.

In the above-described embodiment, although the analyzer 1 is configured such that the control device 100 and the observation device 200 are separated from each other, but the analyzer 1 may be configured such that the control device 100 and the observation device 200 are integrated with each other.
(Processing for Display Control)

In the above-described embodiment, although the server device 300 is provided with the determination unit 321 for determining whether or not a part needs to be replaced, the control device 100 of the analyzer 1 may include a determination unit for determining whether or not a part needs to be replaced.

Figure 14:
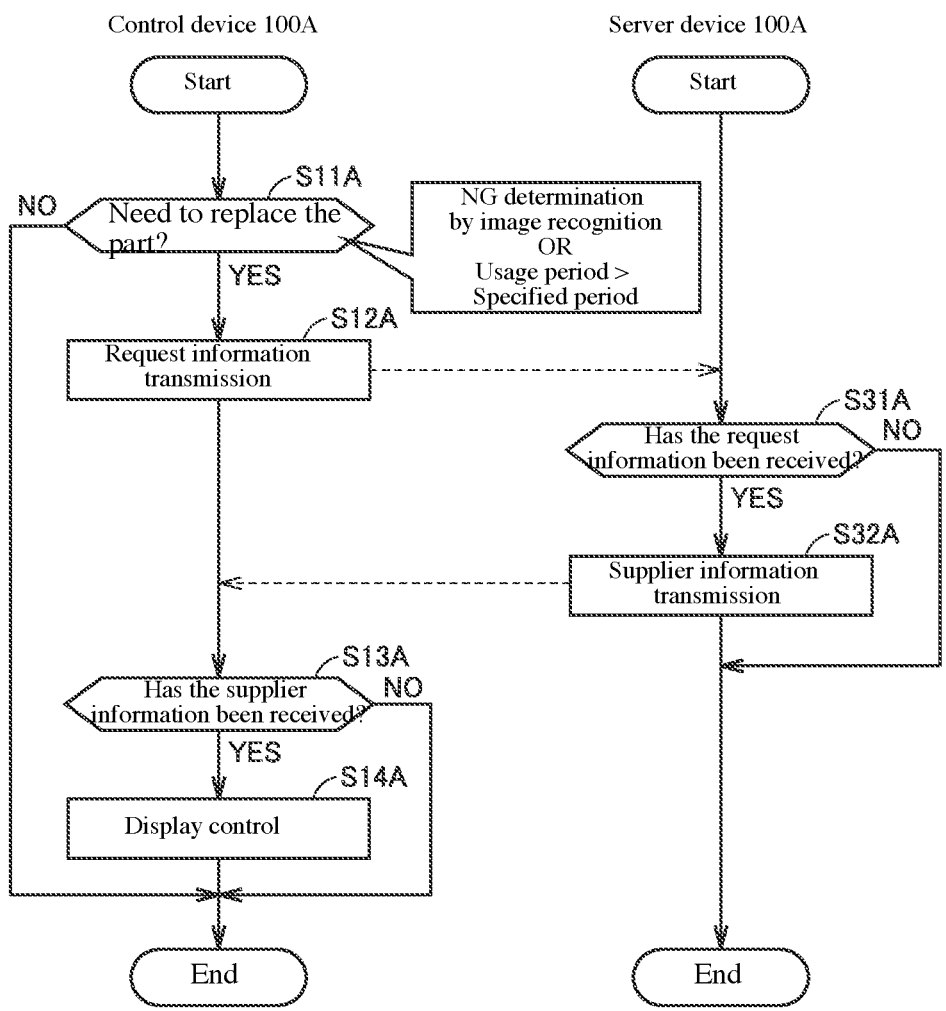
FIG. 14 is a flowchart of the display control at the startup of the software performed by the information providing system according to a modification.

For example, FIG. 14 is a flowchart of the display control at the startup of the software performed by the information providing system according to a modification. The processing step (hereinafter abbreviated as "S") shown in FIG. 14 is realized by performing the display control program 141 by the processor 102 (the operation unit 112) of the control device 100A according to the modification and performing the information provision program 341 by the processor 302 (operation unit 312) of the server device 300A according to the modification.

As shown in FIG. 14, at the startup of the software, the control device 100A determines whether or not a part needs to be replaced (S11A).

More specifically, the control device 100A causes the imaging unit 60 or the imaging unit 70 to image a part (consumable), such as, e.g., a cantilever 10 and a holder 14, and compares the captured image in which the part is reflected with an image in which an NG part (a part that needs to be replaced) stored in the memory 104 is displayed by means of image recognition or the like. When it is determined that the similarity between the two images is equal to or greater than a predetermined threshold by the comparison by means of the image recognition, the control device 100A determines that the part needs to be replaced.

In another approach, the control device 100A calculates the duration of the use of a part, such as, e.g., the cantilever 10 and the holder 14, at previous analyses by the analyzer 1 and determines whether or not the duration of the use has exceeded a prescribed duration. For example, in a case where the cantilever 10 was used continuously for 24 hours at the previous analyses, the control device 100A determines that the cantilever 10 needs to be replaced. When the control device 100A determines that the duration of the use of the part has exceeded the prescribed duration, it determines that the part needs to be replaced.

When the control device 100A determines that the part does not need to be replaced (NO in S11A), the control device 100A ends the processing. When the control device 100A determines that the part needs to be replaced (YES in S11A), the control device 100A transmits the request information requesting the supplier information to the server device 300A (S12A). The request information includes at least any one of the information (e.g., an ID, a password, a user name, an address, a telephone number, etc.) to identify the user of the analyzer 1 and the information (e.g., a serial number, a type, etc.) to identify the part to be used by the user.

The server device 300A determines whether or not it has received the request information (S31A). When the server device 300A has not received the request information (NO in S31A), the server device 300A ends the processing. When the server device 300 has received the request information (YES in S31), the server device 300 identifies the supplier information based on the parts management table 342 and transmits the specified supplier information to the control device 100A (S32A).

After transmitting the request information in S12A, the control device 100A determines whether or not the control device 100A has received the supplier information (S13A). When the control device 100A has not received the supplier information within a predetermined time limit after transmitting the request information (NO in S13A), the control device 100A ends the processing. When the display control device 100A has received the supplier information within a predetermined time after transmitting the request information (YES in S13A), the control device 100A performs the display control for the display device 105 based on the supplier information (S14A).

More specifically, the control device 100A performs the display control for the display device 105 to display the part-related image 160 in a portion of the software startup screen 151 as shown in FIG. 8. Note that the part-related image 160 may include a message "The usage period has exceeded 24 hours" as the information on the degree of consumption of the part. Thereafter, the control device 100A ends the processing.

In this manner, the information providing system according to the modification displays the supplier information on the supplier of the part on the display device 105 when the part needs to be replaced at the startup of the software. With this, the information providing system makes the user analyze the sample S while providing convenience to the user.

Further, the information providing method by the information providing system 1000 according to the modification includes a step (S11A) for determining whether or not the part needs to be replaced at the startup of the software and a step (S14A) of causing the display unit 105 to display the supplier information on the supplier of the part when the part needs to be replaced. With this, the information providing method can make the user analyze the sample S while providing convenience to the user.

Note that the control device 100A may be configured to notify the supplier of the part of at least one of the information indicating that the part needs to be replaced and the information (e.g., the type, the production number, the management number, or the like) for identifying the analyzer 1, at the time of the automatic adjustment when the part needs to be replaced. According to such an information providing method, there is no need for the user itself to contact the supplier of the part.

Figure 15:
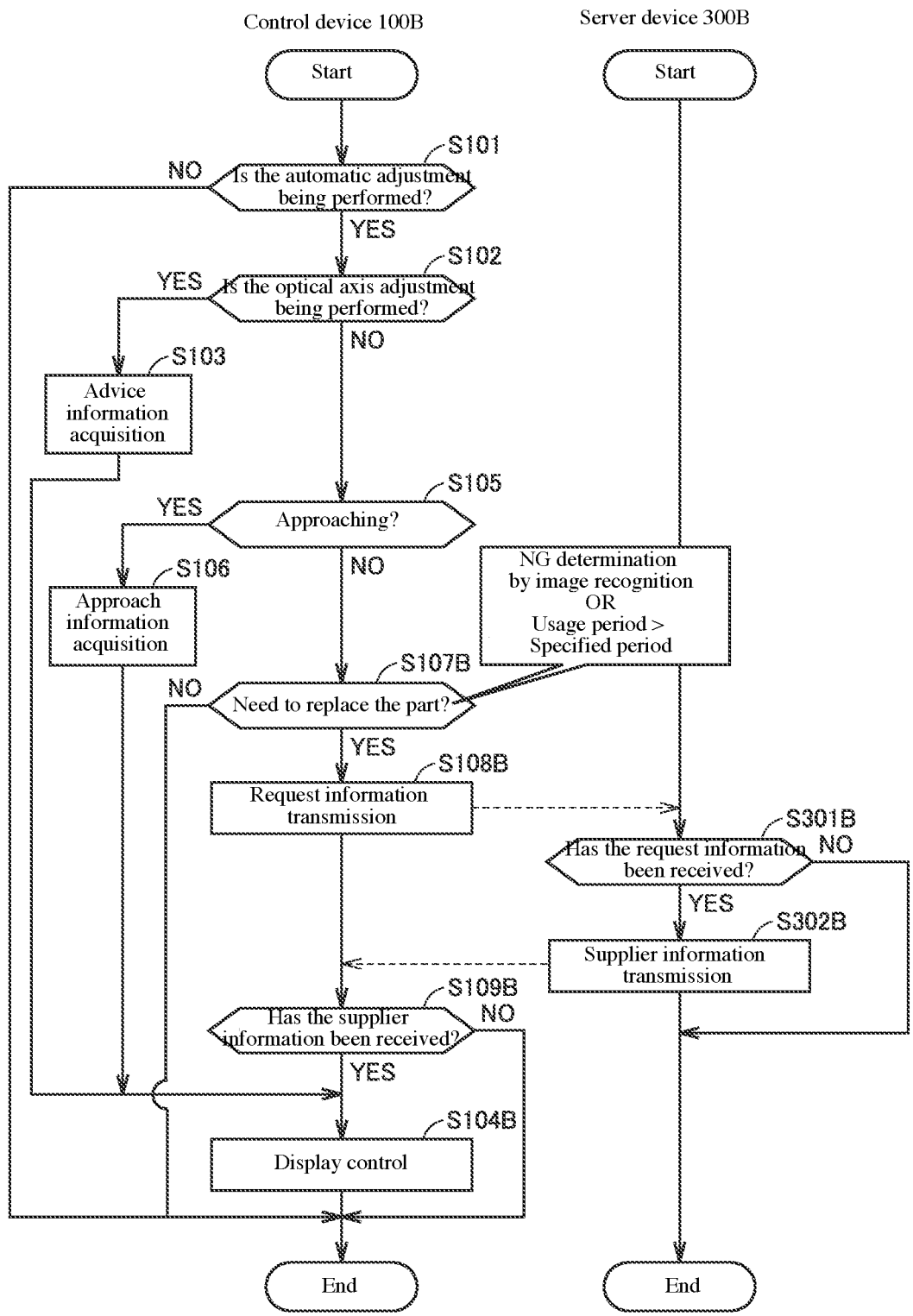
FIG. 15 is a flowchart of the display control at the time of the automatic adjustment performed by the information providing system according to the modification.

FIG. 15 is a flowchart of the display control performed by the information providing system according to the modification at the time of automatic adjustment. The processing step (hereinafter abbreviated as "S") shown in FIG. 15 is realized by performing the display control program 141 by the processor 102 (the operation unit 112) of the control device 100B according to the modification and performing the information provision program 341 by the processor 302 (the operation unit 312) of the server device 300B according to the modification. The steps S101 to S106 of the steps shown in FIG. 15 are the same processing as the steps of S101 to S106 shown in FIG. 13. Therefore, the explanation thereof will be omitted here.

As shown in FIG. 15, the control device 100B determines whether or not the approach is in progress (S105). When the control device 100B has determined that the approach is not in progress (NO in S105), the control device 100B determines whether or not the part needs to be replaced (S107B).

More specifically, the control device 100B images a part (consumable), such as, e.g., the cantilever 10 and the holder 14, with the imaging unit 60 or the imaging unit 70, and compares the captured image in which the part is reflected with a captured image in which an NG part (a part determined to be replaced) stored in the memory 104 is reflected by means of image recognition or the like. When the control device 100B has determined that the similarity between the two images is equal to or greater than a predetermined threshold by the comparison by means of the image recognition, the control device 100B determines that the part needs to be replaced.

As another approach, the control device 100B calculates the duration of use of a part (consumable), such as, e.g., the cantilever 10 and the holder 14, at the previous analyses, and determines whether or not the duration of the use has exceeded a predetermined upper limit period. When the control device 100B has determined that the usage period of the part has exceeded a predetermined upper limit period, the control device 100B determines that the part needs to be replaced.

The control device 100B ends the processing when the part does not need to be replaced (NO at S107B). When the part needs to be replaced (YES in S107B), the control device 100B transmits the request information requesting the supplier information to the server device 300B (S108B). The request information includes at least any one of the information (e.g., an ID, a password, a user name, an address, a telephone number, etc.) to identify the user of the analyzer 1 and the information (e.g., a serial number, a type, etc.) to identify the part to be used by the user.

The server device 300B determines whether or not the server device 300B has received the requested information (S301B). When the server device 300B has not received the request information (NO in S301B), the server device 300B ends the processing. When the server device 300B has received the request information (YES in S301B), the server device 300B identifies the supplier information based on the parts management table 342 and transmits the specified supplier information to the control device 100B (S32A).

After transmitting the request information in S108B, the control device 100B determines in S108B whether or not the control device 100B has received the supplier information. When the control device 100B has not received the supplier information within a predetermined time after transmitting the request information (NO in S109B), the control device 100B ends the processing. When the control device 100B has received the supplier information within a predetermined time since the transmission of the request information (YES in S109B), the control device 100B performs the display control for the display device 105 based on the supplier information (S104B).

Specifically, the control device 100B performs the display control for the display device 105 to display, as shown in FIG. 11, in a portion of the parameter adjustment screen 154, the part-related image 190 and the progress image 192. In the part-related image 190, a message "The usage period has exceeded 24 hours" may be included as the information on the degree of consumption of the part. Thereafter, the control device 100B ends the processing.

As described above, the information providing system according to the modification displays the supplier information on the supplier of the part on the display device 105 when the part needs to be replaced in the step in which the user is waiting, such as, e.g., a step in which the parameter is being adjusted. With this, the information providing system can make the user analyze the sample S while providing convenience to the user.

Further, the information providing method by the information providing system 1000 according to the modification includes a step (S107B) for determining whether or not the part needs to be replaced at the automatic adjustment and a step (S104B) of causing the display unit 105 to display the supplier information on the supplier of the part when the part needs to be replaced. With this, the information providing method can make the user analyze the sample S while providing convenience to the user.

Note that the control device 100B may be configured to notify the supplier of the part of at least one of the information indicating that the part needs to be replaced and the information (e.g., the type, the production number, the management number, or the like) for identifying the analyzer 1 at the time of the automatic adjustment when the part needs to be replaced. According to such an information providing method, there is no need for the user itself to contact the supplier of the part.

In the above-described embodiment, as shown in FIG. 8, in the software startup screen 151, although the information for prompting the replacement of the part, the information on the supplier of the part, and the information on the degree of consumption of the part are displayed, other information may also be displayed. For example, the analyzer 1 may display on the display device 105, in the software startup screen 151, the information on the advice of the analysis of the sample S or the information on the progress of the analysis of the sample S as shown in FIGS. 9 and 10.

In the above-described embodiment, as shown in FIG. 9, in the optical axis adjustment screen 152, the information on the advice of the analysis of the sample S and the information on the progress of the analysis of the sample S are displayed, but other information may also be displayed. For example, the analyzer 1 may display, in the optical axis adjustment screen 152 on the display device 105, as shown in FIGS. 8 and 10, the information for prompting the replacement of the part, the information on the supplier of the part, the information on the degree of consumption of the part, or a live image or an animated image in which the step of analyzing the sample S is imaged.

In this embodiment, as shown in FIG. 10, in the approach screen 153, the live image 181 in which the step for analyzing the sample S is imaged and the information on the progress of the analysis of the sample S are displayed, but other information may also be displayed. For example, the analyzer 1 may display, on the display device 105 in the approach screen 153 as shown in FIGS. 8 and 9, the information on the advice of the analysis of the sample S, the information for prompting the replacement of the part, the information on the supplier of the part, or the information on the degree of consumption of the part.

Further, the analyzer 1 may display the information on another analyzer that differs from the analyzer 1 used by the user as the "predetermined information" on the display device 105. For example, the analyzer 1 may display a commercial message of a new part in at least any one of the software startup screen 151, the optical axis adjustment screen 152, and the approach screen 153.

The analyzer 1 may display the information on the advertisement of the part as the "predetermined information" on the display device 105. For example, the analyzer 1 may display a new part commercial message or the like on the display device 105 in at least one of the software startup screen 151, the optical axis adjustment screen 152, and the approach screen 153.

The analyzer 1 may display the information that does not bore the waiting user, such as, e.g., fortune telling, a weather forecast, a game, etc., as the "predetermined information" on the display device 105.

(Processing Between Server Device and Supplier Terminal)

As shown in FIG. 6, the server device 300 belonging to the device manufacturer side can generally predict the replacement timing of a part based on the user management table 343. Therefore, the server device 300 may transmit the information included in the user management table 343 to the supplier terminal 400 belonging to the parts manufacturer side. This makes it easier for the parts manufacturer to predict the order timing of the part, which makes it possible to carry out sales activities or the like to the user.

[Aspects]

It should be understood by those skilled in the art that the plurality of exemplary embodiments described above is illustrative of the following aspects.

(Item 1-1)

According to the analyzer for analyzing a sample is provided with:
a display unit; and
a display control unit configured to control the display unit.

The display control unit causes the display unit to display predetermined information in a step in which a user is waiting among steps of analyzing the sample.

According to the analyzer as recited in the above-described Item 1-1, the analyzer can make the user analyze the sample without stressing the user as much as possible.

(Item 1-2)

The predetermined information includes at least one of information on advice on an analysis of the sample, information on a part used for the analysis of the sample, information on progress of the analysis of the sample, and information on other analyzers.

According to the analyzer as recited in the above-described Item 1-2, at least any one of the information on the advice of the analysis of the sample, the information on the part used to analyze the sample, the information on the progress of the analysis of the sample, and the information on other analyzers is displayed. Therefore, the analyzer prevents the user from getting bored as much as possible.

(Item 1-3)

The information on the part includes at least one of information for prompting replacement of the part, information on a supplier of the part, information on a degree of consumption of the part, and information on an advertisement of the part.

According to the analyzer as recited in the above-described Items 1-3, by displaying at least one of the information for prompting the replacement of the part, the information on the supplier of the part, the information on the degree of consumption of the part, and the information on the advertisement of the part can be provided to the user, which makes it possible to make the user analyze the sample while providing convenience to the user.

(Item 1-4)

The analyzer is further provided with a determination unit configured to determine whether or not the part used to analyze the sample needs to be replaced.

The display control unit causes the display unit to display information on the part when the part needs to be replaced.

According to the analyzer as recited in the above-described Item 1-4, in a case where the user itself determines whether or not the part needs to be replaced and the part needs to be replaced, the user itself does not need to search the supplier of the part, etc. Therefore, the analyzer can make the user analyze the sample while providing convenience to the user.

(Item 1-5)

The information on the progress of the analysis of the sample includes at least one of an image in which a step of analyzing the sample is imaged and an image in which the steps of analyzing the sample are animated.

According to the analyzer as recited in the above-described Item 1-5, the user can wait while grasping the step of analyzing the sample by the displayed captured image or animated image. Therefore, it is possible to prevent the user from getting bored with the waiting time as much as possible.

(Item 1-6)

The analyzer is a scanning probe microscope for acquiring information on a surface of the sample by scanning a cantilever provided with a probe along the surface of the sample. The step in which the user is waiting includes at least one of a step of adjusting an optical axis for detecting an operation of the cantilever, a step of bringing the probe closer to the surface of the sample, and a step of adjusting a parameter.

According to the analyzer as recited in the above-described Item 1-6, in a user waiting process in which an auto-adjustment is performed, such as, e.g., an optical axis adjustment step, an approach step, and a parameter adjustment step, it is possible to make the user analyze the sample without stressing on the user as much as possible (Item 1-7)

A display control method of controlling a display unit of an analyzer for analyzing a sample according to one aspect of the present disclosure, the method includes the steps of:

determining whether or not it is a step in which a user is waiting among steps of analyzing the sample; and causing the display unit to display predetermined information in the step in which the user is waiting.

According to the display control method as recited in the above-described Item 1-7, it is possible to make the user analyze the sample without stressing the user as much as possible.

(Item 1-8)

A display control program for controlling a display unit of an analyzer for analyzing a sample according to one aspect of the present disclosure makes a computer perform the steps of:

determining whether or not it is a step in which a user is waiting among steps of analyzing the sample; and causing the display unit to display predetermined information in a step in which the user is waiting.

According to the display control program as recited in the above-described Item 1-8, it is possible to make the user analyze the sample without stressing as much as possible.

(Item 2-1)

An information providing system for providing information on a part used to analyze a sample by the analyzer according to one aspect of the present disclosure is provided with:

a determination unit configured to determine whether or not the part needs to be replaced;

a display unit; and a display control unit configured to control the display unit.

The display control unit causes the display unit to display supplier information on the supplier of the part when the part needs to be replaced.

According to the information providing system as recited in the above-described Item 2-1, in a case where the user itself determines whether or not the part needs to be replaced and the part needs to be replaced, the user itself does not need to search the supplier of the part, etc. Therefore, the information providing system can make the user analyze the sample while providing convenience to the user.

(Item 2-2)

The information providing system is provided with the analyzer and a server device in communication with the analyzer. The analyzer includes a device-side communication unit in communication with the server device, the display unit, and the display control unit. The server device includes a server-side communication unit in communication with the analyzer, and the determination unit. The analyzer transmits the determination information for determining whether or not the part needs to be replaced to the server device by the device-side communication unit. The server device determines whether or not the part needs to be replaced based on the determination information by the determination unit and transmits the supplier information to the analyzer by the server-side communication unit when the part needs to be replaced. The analyzer causes the display unit to display the supplier information by the display control unit.

According to the information providing system as recited in the above-described Item 2-2, in a case where the user itself determines whether or not the part needs to be replaced and the part needs to be replaced, the user itself does not need to search the supplier of the part, etc. Therefore, the information providing system can make the user analyze the sample while providing convenience to the user.

(Item 2-3)

The information providing system is further provided with the analyzer and the server device in communication with the analyzer. The analyzer includes a device-side communication unit in communication with the server device, the determination unit, the display unit, and the display control unit. The server device includes a server-side communication unit in communication with the analyzer. The analyzer determines whether or not the part needs to be replaced by the determination unit. The analyzer transmits request information requesting the supplier information to the server device by the device-side communication unit when the part needs to be replaced. The server device transmits the supplier information to the analyzer based on the request information by the server-side communication unit. The analyzer causes the display unit to display the supplier information by the display control unit.

According to the information providing system as recited in the above-described Item 2-3, in a case where the user itself determines whether or not the part needs to be replaced and the part needs to be replaced, the user itself does not need to search the supplier of the part, etc. Therefore, the information providing system can make the user analyze the sample while providing convenience to the user.

(Item 2-4)

The supplier information includes an address for the user to order the part to the supplier.

According to the information providing system as recited in the above-described Item 2-4, the user can efficiently place an order of the part.

(Item 2-5)

The display control unit causes the display unit to display the supplier information in a step in which the user is waiting among steps of analyzing the sample.

According to the information providing system as recited in the above-described Item 2-5, the system can prompt the user to replace the part by using the waiting time during which the user tends to get bored.

(Item 2-6)

The analyzer is a scanning probe microscope for acquiring the information on a surface of the sample by scanning a cantilever provided with a probe along the surface of the sample. The step in which the user is waiting includes at least one of a step of adjusting an optical axis for detecting an operation of the cantilever, a step of bringing the probe closer to the surface of the sample, and a step of adjusting the parameter.

According to the analyzer as recited in the above-described Item 2-6, it is possible to prompt the user to replace the part in a user waiting step in which an automatic adjustment is performed, such as, e.g., the optical axis adjustment step, the approach step, and the parameter adjustment step.

(Item 2-7)

A server device in communication with an analyzer for analyzing a sample according to one aspect of the present disclosure is provided with a server-side communication unit in communication with the analyzer and a determination unit configured to determine whether or not a part used to analyze the sample needs to be replaced. The server-side communication unit transmits supplier information on a supplier of the part to the analyzer when the part needs to be replaced.

According to the server device as recited in above-described Item 2-7, in a case where the user itself determines whether or not the part needs to be replaced and the part needs to be replaced, the user itself does not need to search the supplier of the part, etc. Therefore, the server device can make the user analyze the sample while providing convenience to the user.

(Item 2-8)

An analyzer for analyzing a sample according to one aspect of the present disclosure is provided with a determination unit configured to determine whether or not a part used to analyze a sample needs to be replaced, a display unit, and a display control unit configured to control the display unit. The display control unit causes the display unit to display the supplier information on a supplier of the part when the part needs to be replaced.

According to the analyzer as recited in the above-described Item 2-8, in a case where the user itself determines whether or not the part needs to be replaced and the part needs to be replaced, the user itself does not need to search the supplier of the part, etc. Therefore, the analyzer can make the user analyze the sample while providing convenience to the user.

(Item 2-9)

An information providing method for providing information on a part used to analyze a sample by an analyzer for analyzing a sample according to one aspect of the present disclosure includes the steps of: determining whether or not a part needs to be replaced; and causing the display unit to display supplier information on a supplier of the part when the part needs to be replaced.

According to the information providing method as recited in the above-described Item 2-9, in a case where the user itself determines whether or not the part needs to be replaced and the part needs to be replaced, the user itself does not need to search the supplier of the part, etc. Therefore, the information providing method can make the user perform the analysis of the sample while providing convenience to the user.

(Item 2-10)

An information providing method for providing information on a part used to analyze a sample by an analyzer for analyzing a sample according to one aspect of the present disclosure includes the steps of: determining whether or not the part needs to be replaced, and notifying the supplier of the part of at least one of information indicating that the part needs to be replaced and information for identifying the analyzer when the part needs to be replaced.

According to the information providing method as recited in the above-described Item 2-10, in a case where the user itself determines whether or not the part needs to be replaced and the part needs to be replaced, the user itself does not need to contact the supplier of the part. Therefore, the information providing method can make the user perform the analysis of the sample while providing convenience to the user.

Although some embodiments of the present invention have been described, the embodiments disclosed herein are to be considered in all respects as illustrative and not restrictive. The scope of the present invention is indicated by claims, and it is intended to include all modifications within the meanings and ranges equivalent to those of the claims.

The invention claimed is:

1. An information providing system for providing information on a part used to analyze a sample by an analyzer, comprising:
   a storage unit configured to store a purchase history of the part;
   a determination unit configured to determine whether or not the part needs to be replaced;
   a display unit; and
   a display control unit configured to control the display unit,
   wherein the display control unit causes the display unit to display supplier information on a supplier of the part when the part needs to be replaced, and
   wherein the termination unit is configured to:
      calculate an average interval period for specifying an average interval between purchases of the part based on the purchase history,
      calculate an elapsed period for specifying a period of time that has passed since a last purchase of the part, and
      determine that the part needs to be replaced when the elapsed period exceeds the average interval period.

2. The information providing system as recited in claim 1, further comprising:
   the analyzer; and
   a server device in communication with the analyzer,
   wherein the analyzer includes:
      a device-side communication unit in communication with the server device;
      the display unit; and
      the display control unit,
   wherein the server device includes:
      a server-side communication unit in communication with the analyzer; and
      the determination unit,
   wherein the analyzer is configured to transmit determination information for determining whether or not the part needs to be replaced to the server device by the device-side communication unit,
   wherein the server device is configured to:
      determine whether or not the part needs to be replaced based on the determination information by the determination unit, and
      transmit the supplier information to the analyzer by the server-side communication unit when the part needs to be replaced, and
   wherein the analyzer causes the display unit to display the supplier information by the display control unit.

3. The information providing system as recited in claim 1, further comprising:
   the analyzer; and
   a server device in communication with the analyzer,
   wherein the analyzer includes:
      a device-side communication unit in communication with the server device;
      the determination unit;
      the display unit; and
      the display control unit,
   wherein the server device includes a server-side communication unit in communication with the analyzer,
   wherein the analyzer is configured to:
      determine whether or not the part needs to be replaced by the determination unit, and transmit request information requesting the supplier information to the server device by the device-side communication unit when the part needs to be replaced,
wherein the server device is configured to transmit the supplier information to the analyzer by the server-side communication unit based on the request information, and
wherein the analyzer is configured to cause the display unit to display the supplier information by the display control unit.

4. The information providing system as recited in claim 1, wherein the supplier information includes an address for a user to order the part to the supplier.

5. The information providing system as recited in claim 1, wherein the display control unit is configured to cause the display unit to display the supplier information in a step in which a user is waiting among steps of analyzing the sample.

6. The information providing system as recited in claim 5, wherein the analyzer is a scanning probe microscope for acquiring information on a surface of the sample by scanning a cantilever provided with a probe along the surface of the sample, and
wherein the step in which the user is waiting includes at least one of a step of adjusting an optical axis for detecting an operation of the cantilever, a step of bringing the probe closer to the surface of the sample, and a step of adjusting a parameter.

7. A server device in communication with an analyzer for analyzing a sample, comprising:
a storage unit configured to store a purchase history of a part;
a server-side communication unit in communication with the analyzer; and
a determination unit configured to determine whether or not a part used to analyze the sample needs to be replaced,
wherein the server-side communication unit is configured to transmit supplier information on a supplier of the part to the analyzer when the part needs to be replaced, and
wherein the determination unit is configured to:
calculate an average interval period for specifying an interval between purchases of the part base the purchase history,
calculate an elapsed period for specifying a period of time that has passed since a last purchase of the part, and
determine that the part needs to be replaced when the elapsed period exceeds the average interval period.

8. An analyzer for analyzing a sample, comprising:
a determination unit configured to determine whether or not a part used to analyze a sample needs to be replaced;
a display unit; and
a display control unit configured to control the display unit,
wherein the display control unit causes the display unit to display supplier information on a supplier of the part when the part needs to be replaced; and
wherein the determination unit is configured to:
calculate an average interval period for specifying an average interval between purchases of the part based on a purchase history of the part,
calculate an elapsed period for specifying a period of time that has passed since a last purchase of the part, and
determine that the part needs to be replaced when the elapsed period exceeds the average interval period.

9. An information providing method for providing information on a part used to analyze a sample by an analyzer, the method comprising the steps of:
storing a purchase history of the part;
determining whether or not the part needs to be replaced; and
causing a display unit to display supplier information on a supplier of the part when the part needs to be replaced,
wherein the determining includes:
calculating an average interval period for specifying an average interval between purchases of the part based on the purchase history,
calculating an elapsed period for specifying a period time that has passed since a last purchase of the part, and
determining that the part needs to be replaced when the elapsed period exceeds the average interval period.

10. An information providing method for providing information on a part used to analyze a sample by an analyzer, the method comprising the steps of:
storing a purchase history of the part;
determining whether or not the part needs to be replaced; and
notifying a supplier of the part of at least one of information indicating that the part needs to be replaced and information for identifying the analyzer when the part needs to be replaced,
wherein the determining includes:
calculating an average interval period for specifying an average interval between purchases of the part based on the purchase history,
calculating a elapsed period for specifying period of time that as passed since a last purchase of the part, and
determining that the part needs to be replaced when the elapsed period exceeds the average interval period.

* * * * *